US008927094B2

(12) United States Patent
Sugai

(10) Patent No.: US 8,927,094 B2
(45) Date of Patent: Jan. 6, 2015

(54) PRINTED ARTICLE AND METHOD OF MANUFACTURING PRINTED ARTICLE

(75) Inventor: Keigo Sugai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 13/417,813

(22) Filed: Mar. 12, 2012

(65) Prior Publication Data

US 2012/0237738 A1 Sep. 20, 2012

(30) Foreign Application Priority Data

Mar. 16, 2011 (JP) ................................ 2011-057862
Mar. 16, 2011 (JP) ................................ 2011-057863

(51) Int. Cl.

| | |
|---|---|
| ***B32B 3/00*** | (2006.01) |
| ***B05D 5/00*** | (2006.01) |
| ***B05D 5/06*** | (2006.01) |
| ***B41M 5/00*** | (2006.01) |
| ***B41M 7/00*** | (2006.01) |
| *B41J 3/28* | (2006.01) |
| *B41J 3/407* | (2006.01) |

(52) U.S. Cl.

CPC ............. *B41M 5/007* (2013.01); *B41M 5/0047* (2013.01); *B41M 5/0058* (2013.01); *B41M 5/0064* (2013.01); *B41M 7/0081* (2013.01); *B41J 3/28* (2013.01); *B41J 3/4073* (2013.01)

USPC ......................... 428/195.1; 428/192; 427/256

(58) Field of Classification Search

CPC ............ B32B 2250/26; B32B 2255/10; B32B 2307/71; B32B 27/08; B32B 3/10; B41M 5/0047; B41M 5/005; B41M 5/0058; B41M 5/0064; B41M 5/007; B41M 7/0081; B41J 3/28; B41J 3/4073; B60K 37/02; B60K 2350/1064; B60K 2350/203; G01D 11/28; G01D 13/20; B44F 7/00; G09F 1/00; G09F 2001/00; C09D 11/101; C09D 11/322; C09D 11/40

See application file for complete search history.

(56) References Cited

U.S. PATENT DOCUMENTS

| | | | | |
|---|---|---|---|---|
| 4,523,777 | A * | 6/1985 | Holbein et al. | 283/67 |
| 6,605,174 | B1 * | 8/2003 | Landa et al. | 156/233 |
| 2009/0068418 | A1 | 3/2009 | Iwase et al. | |
| 2009/0244116 | A1 | 10/2009 | Ohnishi | |

FOREIGN PATENT DOCUMENTS

| | | | |
|---|---|---|---|
| JP | 2009-096043 | A | 5/2009 |
| JP | 2009-221416 | A | 10/2009 |
| JP | 2009-233978 | A | 10/2009 |

OTHER PUBLICATIONS

Machine Translation of JP 2009-096043, Iwase et al. via APIN Translation website, forgein document cited on Applicant provided Information Disclosure Statement filed on Mar. 12, 2012.*

* cited by examiner

*Primary Examiner* — Mark Ruthkosky
*Assistant Examiner* — Laura C Powers
(74) *Attorney, Agent, or Firm* — Global IP Counselors, LLP

(57) ABSTRACT

A printed article includes a base material, a first printed layer, a second printed layer, and a third printed layer. The first printed layer is printed with a first ink in a first area of the base material. The second printed layer is printed with a second ink in a second area different from the first area of the base material. The second ink is different in a property or function from the first ink and having a color difference with respect to the first ink. The third printed layer is printed with a third ink, and covers or fills a boundary between the first printed layer and the second printed layer, and has a color difference with respect to the first printed layer and the second printed layer.

13 Claims, 8 Drawing Sheets

PRINTED ARTICLE AND METHOD OF MANUFACTURING PRINTED ARTICLE

CROSS-REFERENCE TO RELATED APPLICATIONS

This application claims priority to Japanese Patent Application Nos. 2011-057862 and 2011-057863 both filed on Mar. 16, 2011. The entire disclosures of Japanese Patent Application Nos. 2011-057862 and 2011-057863 are hereby incorporated herein by reference.

BACKGROUND

1. Technical Field

The present invention relates to a printed article and a method of manufacturing a printed article.

2. Related Art

Printed articles such as interior components in cars, exterior components of electronic devices, and the like, have a base material and a printed layer which has been printed with ink onto the base material. Such printed articles may be subjected, for example, to shearing processes, such as punching, cutting or the like, in order to form openings therein; or to deforming processes involving localized stretching, such as drawing processes or bending processes (for example, see Japanese Laid-Open Patent Application 2009-96043).

The inks employed are radiation curing inks, such as an ultraviolet curing ink.

However, a problem is that inks suitable for shearing processes are not suitable for deforming processes, and conversely that that inks suitable for deforming processes are not suitable for shearing processes.

SUMMARY

The aforedescribed problem can be solved by employing a first ink suitable for deforming processes to form a first printed layer in a region where the deforming process is to be performed, while employing a second ink suitable for a shearing process to form a second printed layer in a region where the shearing process is to be performed.

However, in case in which it is desired to make the first printed layer and the second printed layer the same color, because the polymerizable compounds of the first ink and the second ink are different, even if the same pigment is employed in both the first ink and the second ink, a color difference will arise between the first printed layer and the second printed layer. Where this color difference is very small, and where first printed layer and the second printed layer are separated by at least a predetermined distance, the first printed layer and the second printed layer may appear to be the same color; but even in such a case, there is the drawback that as the first printed layer and the second printed layer come closer together or in contact, the first printed layer and the second printed layer will appear to have different colors. Additionally, a noticeable streak forms at the border of the first printed layer and the second printed layer, markedly diminishing the appearance.

It is an object of the present invention to provide a printed article in which a first printed layer and a second printed layer having a color difference can be made to appear the same color; and a method for manufacturing a printed article.

The object is attained by the aspects of the present invention described below.

A printed article according to one aspect of the present invention includes a base material, a first printed layer, a second printed layer, and a third printed layer. The first printed layer is printed with a first ink in a first area of the base material. The second printed layer is printed with a second ink in a second area different from the first area of the base material. The second ink is different in a property or function from the first ink and having a color difference with respect to the first ink. The third printed layer is printed with a third ink, and covers or fills a boundary between the first printed layer and the second printed layer, and has a color difference with respect to the first printed layer and the second printed layer.

The first printed layer and the second printed layer, which have a color difference, can thereby be made to appear the same color.

In the printed article of one aspect of the present invention, in preferred practice, the color difference of the third printed layer and the first printed layer, when measured by a colorimeter, is 3 or greater; and the color difference of the third printed layer and the second printed layer, when measured by a colorimeter, is 3 or greater.

The first printed layer and the second printed layer, which have a color difference, can thereby be made to appear the same color in a more reliable manner.

In the printed article of one aspect of the present invention, in preferred practice, the third printed layer differs in hue from the first printed layer and the second printed layer.

The first printed layer and the second printed layer, which have a color difference, can thereby be made to appear the same color in a more reliable manner.

In the printed article of one aspect of the present invention, in preferred practice, the third printed layer has higher brightness than the first printed layer and the second printed layer.

The first printed layer and the second printed layer, which have a color difference, can thereby be made to appear the same color in a more reliable manner.

In the printed article of one aspect of the present invention, in preferred practice, the color difference of the first printed layer and the second printed layer, when measured by a colorimeter, is 2 or less.

The first printed layer and the second printed layer, which have a color difference, can thereby be made to appear the same color in a more reliable manner.

In the printed article of one aspect of the present invention, in preferred practice, the first printed layer and the second printed layer are in contact, and the third printed layer covers the boundary between the first printed layer and the second printed layer, as seen from the direction in which the printed article is intended to be viewed.

The first printed layer and the second printed layer, which have a color difference, can thereby be made to appear the same color in a more reliable manner.

In the printed article of one aspect of the present invention, in preferred practice, the first printed layer and the second printed layer are spaced apart from each other, and the third printed layer fills a gap between the first printed layer and the second printed layer.

The first printed layer, the second printed layer, and the third printed layer may thereby be furnished without creating a step.

In the printed article of one aspect of the present invention, in preferred practice, the width of the third printed layer is 0.35 mm or greater.

The first printed layer and the second printed layer can thereby be separated by 0.35 mm or greater, and the first printed layer and the second printed layer, which have a color difference, can thereby be made to appear the same color in a more reliable manner.

In the printed article of one aspect of the present invention, in preferred practice, the base material has a first processing area subjected to a deforming process, and the first printed layer is in the first processing area.

The first processing area can thereby be subjected to a deforming process in a reliable manner.

In preferred practice, the printed article has been deformed at the first processing area.

There can thereby be provided a printed article in which the first processing area has undergone a deforming process in a reliable manner.

In the printed article of one aspect of the present invention, in preferred practice, the base material has a second processing area subjected to a shearing process, and the second ink layer is in the second processing area.

The second processing area can thereby be subjected to a shearing process in a reliable manner.

In preferred practice, the printed article has been sheared at the second processing area.

There can thereby be provided a printed article in which the second processing area has undergone a shearing process in a reliable manner.

In preferred practice, the property of the printed article is a physical property or a chemical property.

There can thereby be provided a printed article having a first printed layer and a second printed layer that mutually differ in terms of a physical property or a chemical property.

In the printed article of one aspect of the present invention, in preferred practice, the first printed layer is formed by applying the first ink as droplets ejected from nozzles by an inkjet method; the second printed layer is formed by applying the second ink as droplets ejected from nozzles by an inkjet method; and the third printed layer is formed by applying the third ink as droplets ejected from nozzles by an inkjet method.

There can thereby be provided a printed article having a first printed layer, a second printed layer, and a third printed layer that are formed with good accuracy.

In the printed article of one aspect of the present invention, in preferred practice, the first ink, the second ink, and the third ink are respectively radiation curing inks; the first printed layer is formed by application of the first ink as droplets ejected from nozzles by an inkjet method, and cured through irradiation with radiation; the second printed layer is formed by application of the second ink as droplets ejected from nozzles by an inkjet method, and cured through irradiation with radiation; and the third printed layer is formed by application of the third ink as droplets ejected from nozzles by an inkjet method, and cured through irradiation with radiation.

There can thereby be provided a printed article having a first printed layer, a second printed layer, and a third printed layer that are formed with good accuracy.

A method of manufacturing a printed article according to one aspect of the present invention includes: printing a first printed layer with a first ink in a first area of a base material; printing a second printed layer with a second ink in a second area different from the first area of the base material, the second ink being different in a property or function from the first ink and having a color difference with respect to the first ink; and printing a third printed layer so as to cover or fill a boundary between the first printed layer and the second printed layer.

The printed article of one aspect of the present invention can be readily and reliably manufactured thereby.

A printed article of one aspect of the present invention has a base material, a first printed layer, a second printed layer and a third printed layer. The first printed layer is printed with a first ink in a first area of the base material. The second printed layer is printed with a second ink in a second area different from the first area of the base material, the second ink being different in a property or function from the first ink and having a color difference with respect to the first ink. The third printed layer covers or fills a boundary between the first printed layer and the second printed layer, and forming a mixed area that includes the first ink and the second ink.

The first printed layer and the second printed layer, which have a color difference, can thereby be made to appear the same color.

In the printed article of one aspect of the present invention, in preferred practice, the third printed layer has a plurality of first pixels printed employing the first ink, and a plurality of second pixels printed employing the second ink.

The first printed layer and the second printed layer, which have a color difference, can thereby be made to appear the same color in a more reliable manner.

In the printed article of one aspect of the present invention, in preferred practice, the first pixels and the second pixels are disposed in a regular arrangement in the third printed layer.

The first printed layer and the second printed layer, which have a color difference, can thereby be made to appear the same color in a more reliable manner.

In the printed article of one aspect of the present invention, in preferred practice, the first pixels and the second pixels are disposed in an irregular arrangement in the third printed layer.

The first printed layer and the second printed layer, which have a color difference, can thereby be made to appear the same color in a more reliable manner.

BRIEF DESCRIPTION OF THE DRAWINGS

Referring now to the attached drawings which form a part of this original disclosure.

DETAILED DESCRIPTION OF EXEMPLARY EMBODIMENTS

The printed article and method of manufacturing a printed article of the present invention are described in detail below on the basis of the presently preferred embodiments shown in the accompanying drawings.

First Embodiment

Figure 1A:
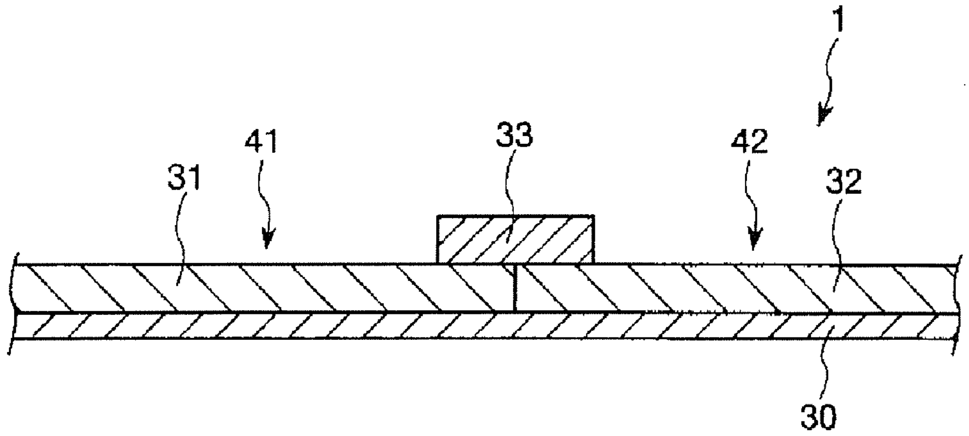
FIGS. 1A and 1B are cross sectional views showing a first embodiment of the printed article of the present invention.
Figure 1B:
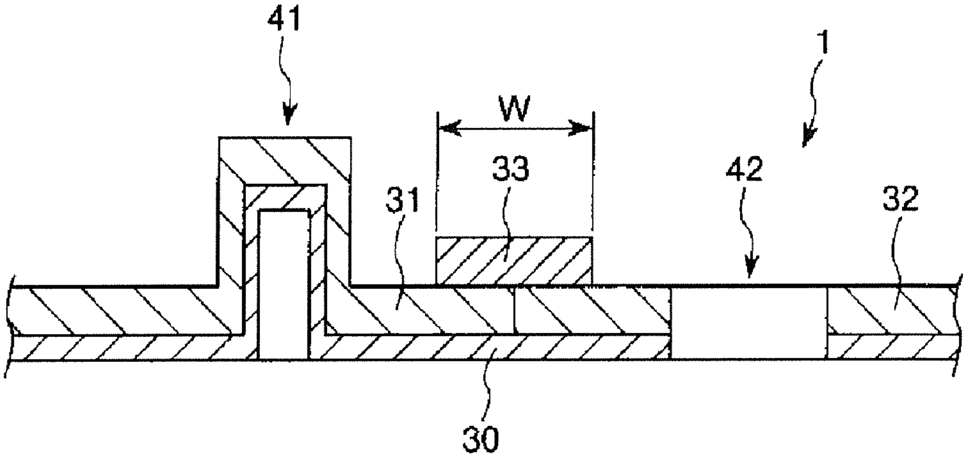
Figure 2:
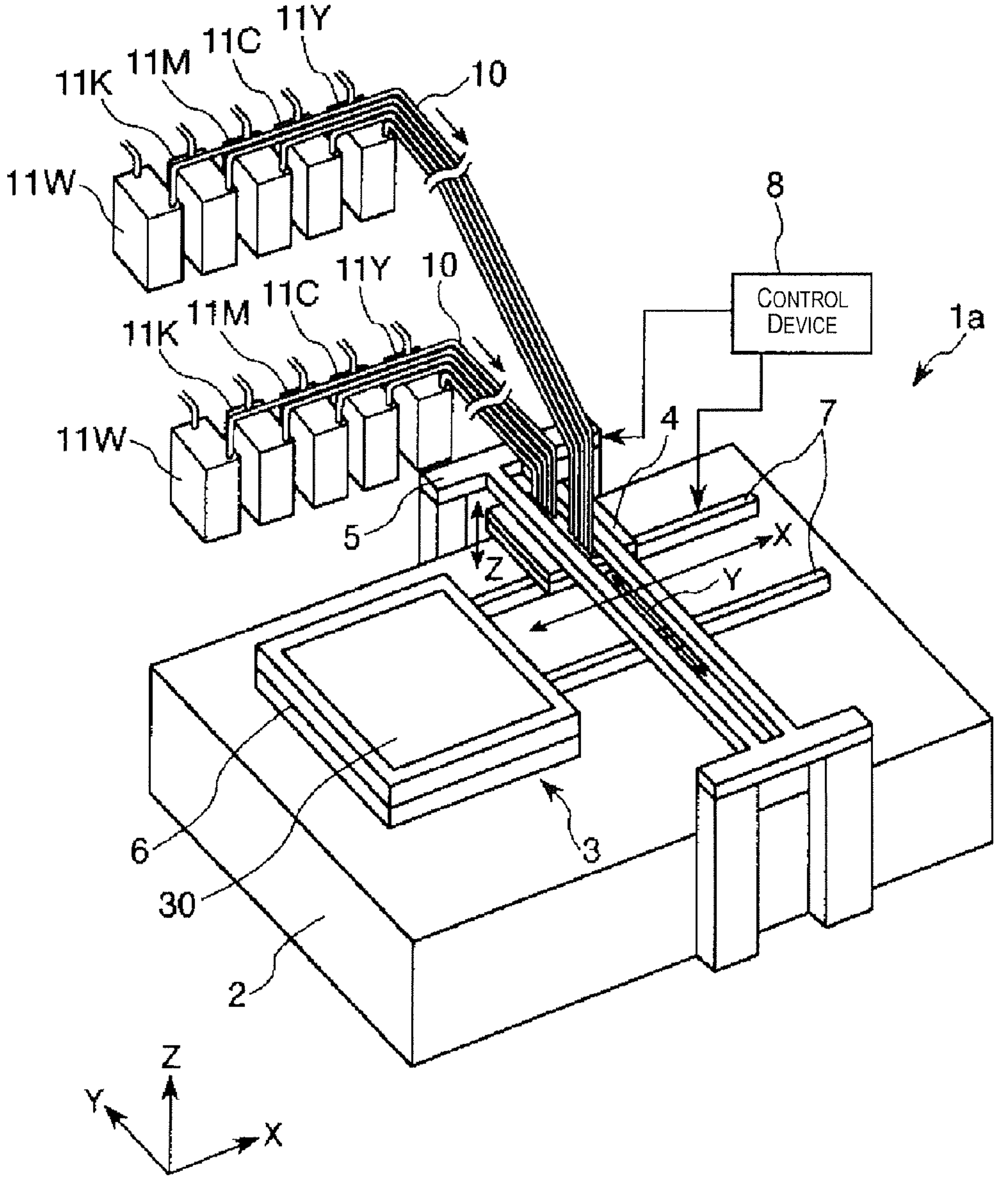
FIG. 2 is a perspective view showing a schematic configuration of a printing device employed in manufacturing the printed article of the present invention.
Figure 3:
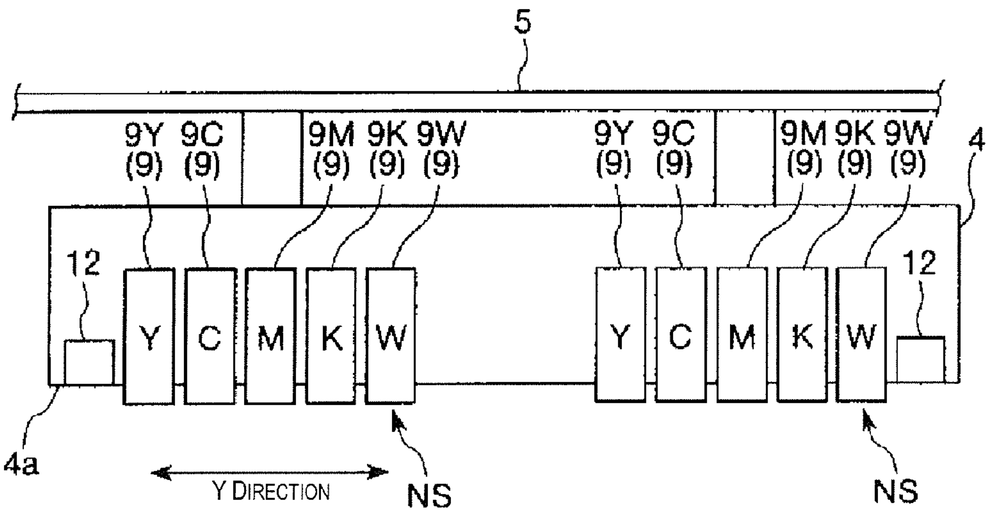
FIG. 3 is a side sectional view showing a schematic configuration of a carriage of the printing device shown in FIG. 2.
Figure 4:
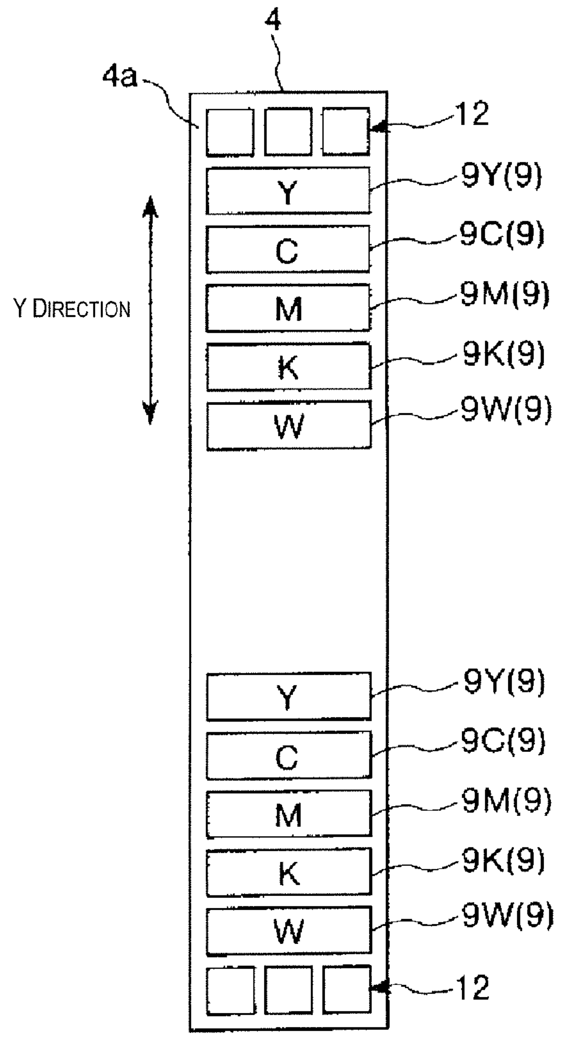
FIG. 4 is a bottom view showing the schematic configuration of the carriage of the printing device shown in FIG. 2.
Figure 5A:
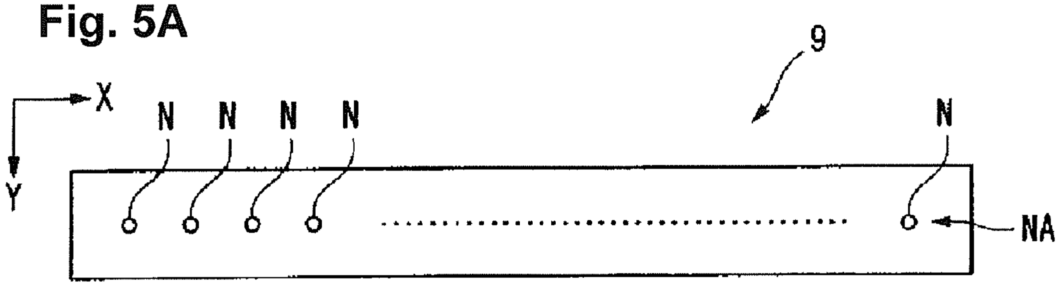
FIGS. 5A to 5C are schematic configuration diagrams of a droplet ejection head.
Figure 5B:
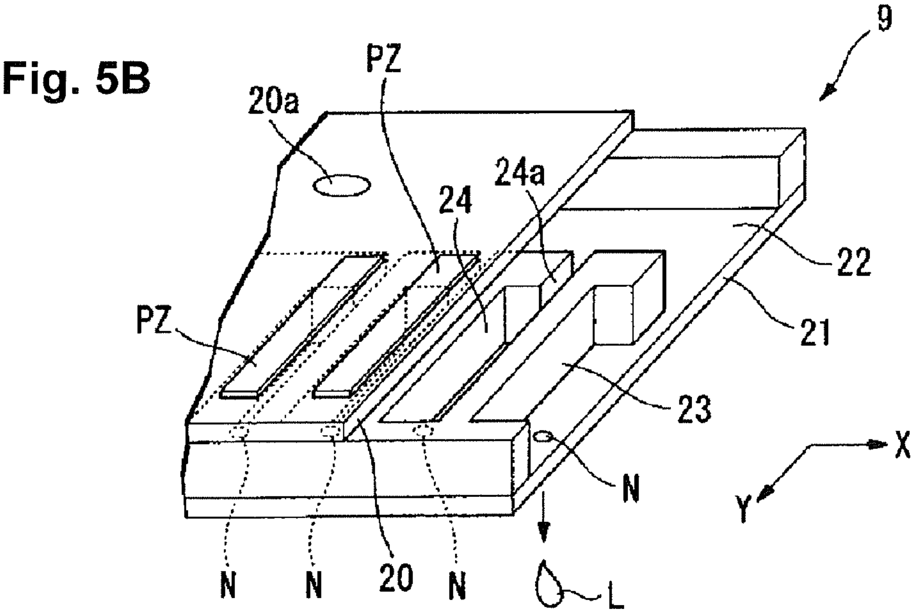
Figure 5C:
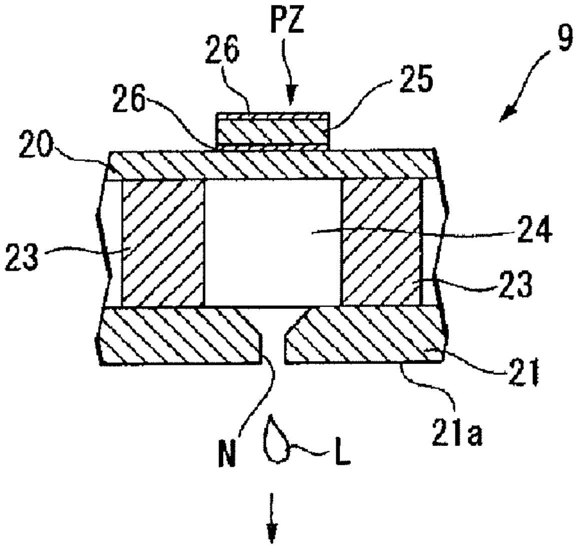

FIGS. 1A and 1B are cross sectional views showing a first embodiment of the printed article of the present invention, wherein FIG. 1A shows the article prior to performing a deforming process and a shearing process, and FIG. 1B shows the article subsequent to performing a deforming process and a shearing process. FIG. 2 is a plan view showing a first printed layer, a second printed layer, and a third printed layer of the printed article shown in FIGS. 1A and 1B; FIG. 2 is a perspective view showing a schematic configuration of a printing device employed in manufacturing the printed article of the present invention; FIG. 3 is a side sectional view showing a schematic configuration of a carriage of the printing device shown in FIG. 2; FIG. 4 is a bottom view showing the schematic configuration of the carriage of the printing device shown in FIG. 2; and FIGS. 5A to 5C are schematic configuration views of a droplet ejection head.

In the following description, the left side in FIGS. 1A and 1B shall be designated as "left," the right side as "right," the top side as "top," and the bottom side as "bottom"; and the left side in FIG. 2 as "left," and the right side as "right." In FIG. 2, the elements are depicted in enlarged form to aid understanding.

As shown in FIGS. 1A and 1B, the printed article 1 is furnished with a base material (substrate) 30; with a first printed layer 31 printed (formed) employing a first ink and a second printed layer 32 printed employing a second ink, the layers being furnished in mutually different areas on the base material 30, and mutually differing in terms of a property or function, as well as having a color difference; and with a third printed layer 33 furnished so as to cover or fill the boundary between the first printed layer 31 and the second printed layer 32, and printed employing a third ink having a color difference with respect to the first printed layer 31 and the second printed layer 32.

Firstly, the first ink, the second ink, and the third ink, i.e., the ink set, will be described.

Ink Set

The ink set that can be employed for manufacture, i.e., for printing, of the printed article 1 is not particularly limited, but is provided with a first ink which is a radiation curing ink containing (a-1) a polymerization initiator and (b-1) a polymerizable compound; a second ink which is a radiation curing ink containing (a-2) a polymerization initiator and (b-2) a polymerizable compound; and a third ink which is a radiation curing ink containing a polymerization initiator and a polymerizable compound. The first ink is the ink employed to form (print) the first printed layer 31; in preferred practice, of the total mass of the (b-1) polymerizable compound, a monofunctional polymerizable compound constitutes 65 mass % or more. The second ink is the ink employed to form the second printed layer 31; in preferred practice, of the total mass of the (b-2) polymerizable compound, a polyfunctional polymerizable compound constitutes 50 mass % or more. The third ink is the ink employed to form the third printed layer 33. Herein, in cases where there is no need to distinguish between the first ink, the second ink, and the third ink, they shall be termed simply "ink" or "radiation curing ink."

An ink set for inkjet recording applications is suitable for use as the aforedescribed ink set.

The radiation curing ink needs to be one that cures at high sensitivity so as to form an image of high image quality.

High sensitivity of the ink imparts high curability in response to irradiation with activating radiation, and therefore confers a number of advantages such as reduced power consumption, and longer service life of the activating radiation generating device due to reduced load; as well as minimizing volatilization of uncured low-molecular weight substances and diminished strength of the formed image. Moreover, the ink needs to have ample scratch resistance and flexibility of the cured film, in order for the image (printed article) obtained thereby to be resistant to cracking, peeling, and the like. Cured films having flexibility and scratch resistance have the merits of being able to be displayed or stored while maintaining high image quality of the printed article for extended periods in various environments, and of ready handling of the printed article.

The first ink contains (a-1) a polymerization initiator and (b-1) a polymerizable compound, and in preferred practice, of the total mass of the (b-1) polymerizable compound, is a monofunctional polymerizable compound (herein also termed a "monofunctional monomer") constitutes 65 mass % or more.

The second ink contains (a-2) a polymerization initiator and (b-2) a polymerizable compound, and in preferred practice, of the total mass of the (b-2) polymerizable compound a polyfunctional polymerizable compound (herein also termed a "polyfunctional monomer") constitutes 50 mass % or more.

In the inks, the mass ratio of the monofunctional polymerizable compound to the total mass of polymerizable compound in the ink is also referred to as the "monofunctional monomer ratio"; and the mass ratio of the polyfunctional polymerizable compound to the total mass of polymerizable compound in the ink is also referred to as the "polyfunctional monomer ratio." The monofunctional monomer ratio (%) and the polyfunctional monomer ratio (%) are rounded off to the closest whole number.

The inks are radiation curing inks curable through irradiation with activating radiation.

The aforedescribed "activating radiation" is not limited in any particular way provided that the activating radiation is one that can impart energy able to generate initiating species in the ink during irradiation therewith, and broadly includes alpha rays, gamma rays, X-rays, ultraviolet (UV), visible light, electron beams, and the like; however, among these, ultraviolet and electron beams, and ultraviolet in particular, are preferred from the standpoint of curing sensitivity and ease of procuring equipment. Consequently, it is preferable for the inks to be inks that are curable by irradiation with ultraviolet.

Here, the first ink and the second ink, i.e., the first printed layer 31 formed by the first ink and the second printed layer 32 formed by the second ink, mutually differ in terms of a property or function.

As the property, there can be cited, for example, a physical property, a chemical property, an electrical property, an electromagnetic property, or the like; however, a physical property or a chemical property is preferred. As physical properties, there may be cited, for example, hardness, viscosity, or the like. As chemical properties, there may be cited, for example, acid resistance, water resistance, light resistance, heat resistance, and the like. As electrical properties, there may be cited, for example, electrical conductivity, resistivity, and the like. As electromagnetic properties, there may be cited, for example, magnetic flux density.

In the present embodiment, when the first printed layer 31 formed by the first ink and the second printed layer 32 formed by the second ink are compared, the first printed layer 31 is more stretchable under heating than is the second printed layer 32, whereas the second printed layer 32 has a higher elastic modulus than the first printed layer 31. Consequently, it is preferable for the first ink to be employed in regions subjected to a deforming process, and for the second ink to be employed in regions that will undergo a shearing process, or be subjected to pressure in association with mounting or the like.

As mentioned previously, the third ink, i.e., the third printed layer 33 formed by the third ink, has a specified color, but may or may not have properties or functions like those of the first printed layer 31 and the second printed layer 32. Accordingly, in this description of the ink set, the discussion will focus on the first ink and the second ink.

The components of the inks are described below.

(a) Polymerization Initiator

Known radical polymerization initiators and known cationic polymerization initiator can be used as polymerization initiators. A single polymerization initiator may be used, or two or more used concomitantly. Radical polymerization initiators and cationic polymerization initiators may be used concomitantly as well.

A polymerization initiator is a compound that absorbs outside energy and generates a polymerization initiating species. The outside energy used in order to initiate polymerization can be broadly distinguished as being heat or activating radiation, with which thermal polymerization initiators and photopolymerization initiators, respectively, would be used. Examples of activating radiation are gamma rays, beta rays, electron beams, ultraviolet, visible light, and infrared.

In cases in which a radical polymerizable compound is used as the polymerizing compound, the ink will preferably contain a radical polymerization initiator; or in cases in which a cationic polymerizable compound is used as the polymerizing compound, will preferably contain a cationic polymerization initiator.

Radical Polymerization Initiators

Examples of radical polymerization initiators include aromatic ketones, acylphosphine compounds, aromatic onium salt compounds, organic peroxides, thio compounds, hexaarylbiimidazole compounds, ketoxime ester compounds, borate compounds, azinium compounds, metallocene compounds, active ester compounds, compounds having a carbon-halogen bond, alkylamine compounds, and the like. For these radical polymerization initiators, the aforedescribed compounds may be used singly or in combination. Radical polymerization initiators may be used singly or in combinations of two or more.

Cationic Polymerization Initiators

Examples of cationic polymerization initiators (photo-acid generators) include chemically amplified photoresists and compounds used in cationic photopolymerization ("Imejingu you Yukizairyou" [Organic Materials for Imaging], Ed. The Japanese Research Association for Organic Electronics Materials, Bunshin Publishing Co. (1993), pp. 187-192).

Firstly, $B(C_6F_5)_4^-$, $PF6^-$, $AsF_6^-$, $SbF_6^-$, and $CF_3SO_3^-$ salts of diazonium, ammonium, iodonium, sulfonium, phosphonium, and other aromatic onium compounds can be cited. Secondly, sulfonates that generate sulfonic acid can be cited. Thirdly, halides that photogenerate a hydrogen halide can also be employed. Fourthly, iron arene complexes can be cited.

In the inks, the respective total amount of polymerization initiator used is 0.01 to 35 mass %, more preferably 0.5 to 20 mass %, and still more preferably 1.0 to 20 mass %, with respect to the total amount of polymerizable compound used. With 0.1 mass % or above, the ink can be sufficiently cured; and with 35 wt % or less, a cured film having a uniform degree of curing can be obtained.

Additionally, when a sensitizer, to be described later, is employed in the ink, the total amount of polymerization initiator used, expressed as the mass ratio of the polymerization initiator to the sensitizer, is preferably such that the polymerization initiator:sensitizer ratio is 200:1 to 1:200, more preferably 50:1 to 1:50, and still more preferably 20:1 to 1:5.

(b) Polymerizable Compound

The inks contain a polymerizable compound.

The polymerizable compound preferably has a molecular weight of no greater than 1,000, more preferably 50 to 800, and yet more preferably 60 to 500.

The polymerizable compound is not particularly limited, and may be any compound that, when imparted with energy of some sort, gives rise to a polymerization reaction such as a radical polymerization reaction, a cationic polymerization reaction, or an anionic polymerization reaction, to bring about curing. Monomers, oligomers, and polymers of any kind may be used, and various types of known polymerizable monomers, known as photopolymerizable compounds, which give rise to a polymerization reaction by an initiating species generated from the polymerization initiator, can be used.

Examples of preferred polymerizable compounds are radical polymerizable compound and cationic polymerizable compounds.

Radical Polymerizable Compounds

The radically polymerizable compound is not particularly limited, and known radically polymerizable compounds may be employed. An ethylenically unsaturated compound is preferred, a (meth)acrylate compound; a (meth)acrylamide compound, an N-vinyl compound, and/or a vinyl ether compound is more preferred; and a (meth)acrylate compound and/or an N-vinyl compound is still more preferred. Herein, "(meth) acrylic" signifies both acrylic and methacrylic.

In cases in which a radically polymerizable compound is used in the first ink, of the total mass of the (b-1) polymerizable compound in the first ink, a monofunctional radically polymerizable compound preferably constitutes 67 to 100 mass %, more preferably 70 to 100 mass %, and still more preferably 85 to 95 mass %. Within the above ranges, the images obtained have excellent flexibility.

In cases in which a radically polymerizable compound is used in the second ink, of the total mass of the (b-2) polymerizable compound in the second ink, a polyfunctional radically polymerizable compound preferably constitutes 55 to 100 mass %, more preferably 60 to 100 mass %, and still more preferably 80 to 100 mass %. It is especially preferable for 100 mass %, i.e., all of the (b-2) polymerizable compound, to be a polyfunctional radically polymerizable compound. Within the above ranges, the images obtained have excellent scratch resistance and solvent resistance.

The radically polymerizable compound may be monofunctional or polyfunctional.

As monofunctional radically polymerizable compounds, an N-vinyl compound, to be described later, is preferred, and an N-vinyl lactam is more preferred.

Furthermore, in cases in which a radically polymerizable compound is used as the (b-1) polymerizable compound in the first ink, the first ink preferably contains an N-vinyl compound, to be described later, and particularly preferably contains an N-vinyl lactam.

As polyfunctional radically polymerizable compounds, a polyfunctional (meth)acrylate compound, to be described later, is preferred. Herein, "(meth)acrylic" signifies both acrylic and methacrylic.

As polyfunctional radically polymerizable compounds, the use in combination of a difunctional radically polymerizable compound and a tri- or higher-functional radically polymerizable compound is preferred; and the use in combination of a difunctional radically polymerizable compound and a trifunctional radically polymerizable compound is more preferred.

In cases in which a radically polymerizable compound is used as the (b-2) polymerizable compound in the second ink, of the total mass of the (b-2) polymerizable compound in the second ink, a difunctional radically polymerizable compound preferably constitutes 30 to 100 mass %, more preferably 50 to 95 mass %, and still more preferably 70 to 90 mass %. Of the total mass of the (b-2) polymerizable compound in the second ink, a tri- or higher-functional radically polymerizable compound preferably constitutes 5 to 50 mass %, and more preferably 10 to 30 mass %. Of the total mass of the (b-2) polymerizable compound in the second ink, a trifunctional radically polymerizable compound preferably constitutes 5 to 50 mass %, and more preferably 10 to 30 mass %.

In cases in which a radically polymerizable compound is used in the first ink, of the total mass of the first ink, a monofunctional radically polymerizable compound preferably constitutes 50 to 95 mass %, more preferably 55 to 90 mass %, and still more preferably 60 to 85 mass % of the first ink. Within the above ranges, the images obtained have excellent flexibility.

In cases in which a radically polymerizable compound is used in the second ink, of the total mass of the second ink, a polyfunctional radically polymerizable compound preferably constitutes 50 to 98 mass %, more preferably 55 to 95 mass %, and still more preferably 60 to 90 mass % of the second ink. Within the above ranges, the images obtained have excellent scratch resistance and solvent resistance.

Monofunctional radically polymerizable compounds and polyfunctional radically polymerizable compounds are explained below.

Monofunctional Radically Polymerizable Monomer

A monofunctional radically polymerizable monomer may be used as the radically polymerizable compound.

Preferred examples of monofunctional radically polymerizable monomers include monofunctional acrylate compounds, monofunctional methacrylates, monofunctional N-vinyl compounds, monofunctional acrylamide compounds, and monofunctional methacrylamide compounds, with monofunctional acrylate compounds, monofunctional methacrylate compounds, and monofunctional N-vinyl compounds being more preferred.

In cases in which the first ink contains a monofunctional radically polymerizable monomer, as the monofunctional radically polymerizable monomer it is preferable to concomitantly use a monofunctional acrylate compound and a monofunctional N-vinyl compound, or a monofunctional methacrylate compound and a monofunctional N-vinyl compound; concomitant use of a monofunctional acrylate compound and a monofunctional N-vinyl compound is especially preferred.

As monofunctional radically polymerizable monomers, it is preferable to use a monomer having a cyclic structure and only one ethylenically unsaturated double bond group selected from the group consisting of an acryloyloxy group, a methacryloyloxy group, an acrylamide group, a methacrylamide group, and an N-vinyl group.

Ethylenically unsaturated compounds may be cited as radically polymerizable monomers that can be suitably used.

As preferred examples of monofunctional acrylates, monofunctional methacrylates, monofunctional vinyloxy compounds, monofunctional acrylamides, and monofunctional methacrylamides, there may be cited monofunctional radically polymerizable monomers having a group with a cyclic structure, such as a phenyl group, a naphthyl group, an anthracenyl group, a pyridinyl group, a tetrahydrofurfuryl group, a piperidinyl group, a cyclohexyl group, a cyclopentyl group, a cycloheptyl group, an isoboronyl group, or a tricyclodecanyl group.

Preferred examples of monofunctional radically polymerizable monomers include norbornyl(meth)acrylate, isoboronyl(meth)acrylate, cyclohexyl (meth)acrylate, cyclopentyl (meth)acrylate, cycloheptyl(meth)acrylate, cyclooctyl(meth) acrylate, cyclodecyl(meth)acrylate, dicyclodecyl(meth) acrylate, trimethylcyclohexy(meth)acrylate, 4-t-butylcyclohexyl(meth)acrylate, acryloylmorpholine, 2-benzyl(meth)acrylate, phenoxyethyl(meth)acrylate, phenoxydiethylene glycol(meth)acrylate, phenoxytriethylene glycol(meth)acrylate, EO-modified cresol(meth)acrylate, tetrahydrofurfuryl(meth)acrylate, caprolactone-modified tetrahydrofurfuryl acrylate, nonylphenoxy polyethylene glycol (meth)acrylate, neopentyl glycol benzoate(meth)acrylate, paracumylphenoxyethylene glycol(meth)acrylate, N-phthalimidoethyl(meth)acrylate, pentamethylpiperidyl(meth)acrylate, tetramethylpiperidyl(meth)acrylate, N-cyclohexyl acrylamide, N-(1,1-dimethyl-2-phenyl)ethyl acrylamide, N-diphenylmethyl acrylamide, N-phthalimidomethyl acrylamide, N-(1,1'-dimethyl-3-(1,2,4-triazol-1-yl))propyl acrylamide, and 5-(meth)acryloyloxymethyl-5-ethyl-1,3-dioxacyclohexane.

As the monofunctional radically polymerizable monomer, it is preferable to use a radically polymerizable monomer having an N-vinyl group, and a group having a cyclic structure. Of these, it is preferable to use N-vinylcarbazole, 1-vinylimidazole, or N-vinyl lactams, and still more preferable to use N-vinyl lactams.

The first ink preferably contains a monofunctional cyclic polymerizable monomer having an N-vinyl group, in an amount of 1 to 40 mass %, more preferably 10 to 35 wt %, and still more preferably 12 to 30 wt %, of the entire first ink. Within the above ranges, copolymerizability with other polymerizable compounds is good, and an ink having excellent curability and anti-blocking properties is obtained.

The first ink preferably contains a monofunctional N-vinyl lactam in an amount of 1 to 40 mass %, more preferably 10 to 35 wt %, and still more preferably 12 to 30 wt %, of the entire first ink.

Where the amount of monofunctional N-vinyl lactams used is in the aforedescribed numerical ranges, curability, cured film flexibility, and cured film adhesion to a support are excellent. N-vinyl lactams are compounds having a relatively high melting point. Where the content of N-vinyl lactams is 40 mass % or less, solubility is good even at low temperatures of 0° C. or below, affording a wider temperature range in which the ink composition may be handled.

As monofunctional radically polymerizable monomers, acyclic monofunctional monomers such as the following may be used. Acyclic monofunctional monomers have relatively low viscosity and are preferable for use, for example, for the purpose of lowering the viscosity of the ink. However, from the viewpoint of minimizing tackiness of the cured coating and imparting high film strength so that scratches, etc., do not occur during molding processes, the proportion of the following acyclic monofunctional monomers in the total ink is preferably 20 mass % or less, more preferably 15 mass % or less.

Specific examples include octyl(meth)acrylate, 2-ethylhexyl(meth)acrylate, decyl(meth)acrylate, dodecyl(meth) acrylate, tridecyl(meth)acrylate, tetradecyl(meth)acrylate, hexadecyl(meth)acrylate, 2-hydroxyethyl(meth)acrylate, butoxyethyl(meth)acrylate, carbitol(meth)acrylate, 2-ethylhexyl diglycol(meth)acrylate, polyethylene glycol(meth) acrylate monomethyl ether, polypropylene glycol(meth) acrylate monomethyl ether, and polytetraethylene glycol (meth)acrylate monomethyl ether.

Other examples besides these include (poly)ethylene glycol mono(meth)acrylate, (poly)ethylene glycol(meth)acrylate methyl ester, (poly)ethylene glycol(meth)acrylate ethyl ester, (poly)ethylene glycol(meth)acrylate phenyl ester, (poly)propylene glycol mono(meth)acrylate, (poly)ethylene glycol mono(meth)acrylate phenyl ester, (poly)propylene glycol(meth)acrylate methyl ester, (poly)propylene glycol (meth)acrylate ethyl ester, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfuryl acrylate, benzyl acrylate, oligoester acrylate, N-methylolacrylamide, diacetone acrylamide, epoxy acrylate, methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glycidyl methacrylate, benzyl methacrylate, dimethylaminomethyl methacrylate, and allyl glycidyl ether.

Further examples include 2-ethylhexyl-diglycol acrylate, 2-hydroxy-3-phenoxylpropyl acrylate, 2-hydroxybutyl acrylate, 2-acryloyloxyethylphthalic acid, 2-acryloyloxyethyl-2-hydroxyethylphthalic acid, ethoxylated phenyl acrylate, 2-acryloyloxyethylsuccinic acid, 2-acryloyloxyethylhexahydrophthalic acid, lactone-modified flexible acrylate, butoxyethyl acrylate, 2-hydroxyethyl acrylate, and methoxydipropylene glycol acrylate.

Polyfunctional Radically Polymerizable Monomers

Polyfunctional radically polymerizable monomers may be used as the radically polymerizable compound.

Examples of preferred polyfunctional radically polymerizable monomers include polyfunctional polymerizable monomers having two or more ethylenically unsaturated double bonds selected from the group consisting of an acryloyloxy group, a methacryloyloxy group, an acrylamide group, a methacrylamide group, a vinyloxy group, and an N-vinyl group. By virtue of containing a polyfunctional polymerizable monomer, an ink having high cured coating strength is obtained.

Examples of polyfunctional polymerizable monomers having a radically polymerizable ethylenically unsaturated bond preferred for employment herein include unsaturated carboxylic acids such as acrylic acid, methacrylic acid, itaconic acid, crotonic acid, isocrotonic acid, and maleic acid, and salts thereof; anhydrides having an ethylenically unsaturated group; acrylonitrile; styrene; and various types of unsaturated polyesters; unsaturated polyethers; unsaturated polyamides; and (meth)acrylic acid esters of unsaturated urethane(meth)acrylic monomers or prepolymers, epoxy monomers or prepolymers, or urethane monomers or prepolymers, which compounds have two or more ethylenically unsaturated double bonds.

As specific examples, there may cited neopentyl glycol di(meth)acrylate, (poly)ethylene glycol di(meth)acrylate, diethylene glycol di(meth)acrylate, triethylene glycol di(meth)acrylate, tetraethylene glycol di(meth)acrylate, polypropylene glycol di(meth)acrylate, (poly)tetramethylene glycol di(meth)acrylate, bisphenol A propylene oxide (PO) adduct di(meth)acrylate, ethoxylated neopentyl glycol di(meth)acrylate, propoxylated neopentyl glycol di(meth) acrylate, bisphenol A ethylene oxide (EO) adduct di(meth) acrylate, EO-modified pentaerythritol tri(meth)acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra (meth)acrylate, PO-modified dipentaerythritol tetra(meth) acrylate, EO-modified trimethylolpropane tri(meth)acrylate, PO-modified trimethylolpropane tri(meth)acrylate, EO-modified tetramethylolmethane tetra(meth)acrylate, PO-modified tetramethylolmethane tetra(meth)acrylate, pentaerythritol tri(meth)acrylate, pentaerythritol tetra(meth) acrylate, dipentaerythritol tetra(meth)acrylate, trimethylolpropane tri(meth)acrylate, tetramethylolmethane tetra(meth)acrylate, trimethylolethane tri(meth)acrylate, trimethylolpropane tri(meth)acrylate, bis(4-(meth)acryloxy-polyethoxyphenyl)propane, diallyl phthalate, triallyl trimellitate, 1,6-hexanediol di(meth)acrylate, 1,9-nonanediol di(meth)acrylate, 1,10-decanediol di(meth)acrylate, neopentyl glycol hydroxypivalate di(meth)acrylate, tetramethylolmethane tri(meth)acrylate, dimethyloltricyclodecane di(meth)acrylate, modified glycerol tri(meth)acrylate, bisphenol A diglycidyl ether (meth)acrylic acid adduct, modified bisphenol A di(meth)acrylate, caprolactone-modified dipentaerythritol hexa(meth)acrylate, dipentaerythritol hexa(meth)acrylate, pentaerythritol tri(meth)acrylate tolylene diisocyanate urethane prepolymer, pentaerythritol tri(meth)acrylate hexamethylene diisocyanate urethane prepolymer, ditrimethylolpropane tetra(meth)acrylate, and pentaerythritol tri(meth)acrylate hexamethylene diisocyanate urethane prepolymer. In more specific terms, commercial products, or radically polymerizable/crosslinking monomers, oligomers, and polymers known in the industry, such as those described in "Kakyozai Handobukku" [Crosslinking Agent Handbook], Ed. S. Yamashita (Taiseisha, 1981); in "UV• EB Koka Handobukku (Genryo)" [UV• EB Curing Handbook (Starting Materials)] Ed. K. Kato (Kobunshi Kankoukai, 1985); in "UV• EB Koka Gijutsu no Oyo to Shijyo" [Applications and Markets for UV• EB Curing Technology], p. 79, Ed. Rad Tech (CMC, 1989); and E. Takiyama "Poriesuteru Jushi Handobukku" [Polyester Resin Handbook], (The Nikkan Kogyo Shimbun Ltd., 1988) may be employed.

Among these, the following polyfunctional polymerizable monomers can be cited as preferred examples.

As preferred examples of difunctional radically polymerizable monomers, there can be cited ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated neopentyl glycol diacrylate, and propoxylated neopentyl glycol diacrylate.

Further, it is preferable to employ a vinyl ether compound as the radically polymerizable compound.

The monomers cited above as examples of the radically polymerizable compounds have high reactivity, low viscosity, and excellent adhesion to a support.

Cationically Polymerizable Compounds

From the standpoint of curability and abrasion resistance, oxetane ring-containing compounds and oxirane ring-containing compounds are suitable cationically polymerizable compounds; a mode in which both an oxetane ring-containing compound and an oxirane ring-containing compound are contained is preferred.

Here, an oxirane ring-containing compound (also termed "an oxirane compound" herein) refers to a compound including at least one oxirane ring (an oxiranyl group or epoxy group) in the molecule; and in more specific terms may be one selected appropriately from those commonly used as epoxy resins, for example, conventional known aromatic epoxy resins, alicyclic epoxy resins, and aliphatic epoxy resins. Monomers, oligomers, and polymers are all acceptable.

An oxetane ring-containing compound (also called an "oxetane compound" herein) refers to a compound including at least one oxetane ring (oxetanyl group) in the molecule.

In cases in which a cationically polymerizable compound is used in the first ink, of the total mass of the (b-1) polymerizable compound, the monofunctional cationically polymerizable compound preferably constitutes 65 to 95 mass %, more preferably 65 to 85 mass %, and still more preferably 65 to 75 mass %. Within the above-mentioned ranges, the images obtained have excellent flexibility.

In cases in which a cationically polymerizable compound is used in the second ink, of the total mass of the (b-2) polymerizable compound, the polyfunctional cationically polymerizable compound preferably constitutes 50 to 90 mass %, more preferably 52 to 75 mass %, and still more preferably 55 to 65 mass %. Within the above-mentioned ranges, the images obtained have scratch resistance and solvent resistance.

The cationically polymerizable compound may be monofunctional or polyfunctional.

A monofunctional oxirane compound and/or a monofunctional oxetane compound are preferred monofunctional cationically polymerizable compounds.

A difunctional cationically polymerizable compound is a preferred polyfunctional cationically polymerizable compound. The polyfunctional cationically polymerizable compound is preferably a polyfunctional oxirane compound and/or a polyfunctional oxetane compound, with concomitant use of a polyfunctional oxirane compound and a polyfunctional oxetane compound being more preferable.

In cases in which a cationically polymerizable compound is used in the first ink, of the total mass of the first ink, the monofunctional cationically polymerizable compound preferably constitutes 40 to 95 mass %, more preferably 45 to 80 mass %, and still more preferably 45 to 65 mass %, of the first ink. Within the above-mentioned ranges, the images obtained have excellent flexibility.

In cases in which a cationically polymerizable compound is used in the second ink, of the total mass of the second ink, the polyfunctional cationically polymerizable compound preferably constitutes 35 to 90 mass %, more preferably 38 to 75 mass %, and still more preferably 40 to 60 mass %, of the second ink. Within the above-mentioned ranges, the images obtained have scratch resistance and solvent resistance.

Monofunctional cationically polymerizable compounds and polyfunctional cationically polymerizable compounds are described in detail below.

Examples of cationically polymerizable compounds include, for example, the epoxy compounds, vinyl ether compounds, and oxetane compounds disclosed inter alia in JP-A-6-9714, JP-A-2001-31892, JP-A-2001-40068, JP-A-2001-55507, JP-A-2001-310938, JP-A-2001-310937, JP-A-2001-220526.

As examples of monofunctional epoxy compounds, there may be cited, for example, phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, 3-vinylcyclohexene oxide, and the like.

As examples of polyfunctional epoxy compounds, there may be cited, for example, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl)-7,8-epoxy-1,3-dioxaspiro[5.5]undecane, bis(3,4-epoxycyclohexylmethyl) adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentadiene diepoxide, the di(3,4-epoxycyclohexylmethyl) ether of ethylene glycol, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ethers, 1,13-tetradecadiene dioxide, limonene dioxide, 1,2,7,8-diepoxyoctane, 1,2,5,6-diepoxycyclooctane, and the like.

Of these epoxy compounds, aromatic epoxides and alicyclic epoxides are preferable from the standpoint of excellent curing speed, with alicyclic epoxides being particularly preferred.

As vinyl ether compounds, di- or tri-vinyl ether compounds are preferable from the standpoint of curability, adhesion to a support, and surface hardness of the image formed. Divinyl ether compounds are particularly preferred.

The oxetane compound used may be selected from among any of the known oxetane compounds, such as those disclosed in JP-A-2001-220526, JP-A-2001-310937, and JP-A-2003-341217.

As the oxetane compound, a compound having 1 to 4 oxetane rings in the structure is preferable. Through the use of such a compound, the viscosity of the inkjet recording liquid is readily maintained in a range affording good handling properties; moreover, an ink that, when cured, has high adhesion to a support can be obtained.

As examples of monofunctional oxetane compounds, there may be cited, for example, 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl) ether, isobornyloxyethyl(3-ethyl-3-oxetanylmethyl) ether, isobornyl(3-ethyl-3-oxetanylmethyl) ether, 2-ethylhexyl(3-ethyl-3-oxetanylmethyl) ether, ethyl diethylene glycol(3-ethyl-3-oxetanylmethyl) ether, dicyclopentadiene(3-ethyl-3-oxetanylmethyl) ether, dicyclopentenyloxyethyl(3-ethyl-3-oxetanylmethyl) ether, dicyclopentenyl(3-ethyl-3-oxetanylmethyl) ether, tetrahydrofurfuryl(3-ethyl-3-oxetanylmethyl) ether, tetrabromophenyl(3-ethyl-3-oxetanylmethyl) ether, 2-tetrabromophenoxyethyl(3-ethyl-3-oxetanylmethyl) ether, tribromophenyl(3-ethyl-3-oxetanylmethyl) ether, 2-tribromophenoxyethyl(3-ethyl-3-oxetanylmethyl) ether, 2-hydroxyethyl(3-ethyl-3-oxetanylmethyl) ether, 2-hydroxypropyl(3-ethyl-3-oxetanylmethyl) ether, butoxyethyl(3-ethyl-3-oxetanylmethyl) ether, pentachlorophenyl(3-ethyl-3-oxetanylmethyl) ether, pentabromophenyl(3-ethyl-3-oxetanylmethyl) ether, bornyl(3-ethyl-3-oxetanylmethyl) ether, and the like.

As examples of polyfunctional oxetane compounds, there may be cited, for example, 3,7-bis(3-oxetanyl)-5-oxanonane, 3,3'-(1,3-(2-methylenyl)propanediylbis(oxymethylene))bis(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl) ether, dicyclopentenylbis(3-ethyl-3-oxetanylmethyl) ether, triethylene glycol bis(3-ethyl-3-oxetanylmethyl) ether, tetraethylene glycol bis(3-ethyl-3-oxetanylmethyl) ether, tricyclodecanediyldimethylene(3-ethyl-3-oxetanylmethyl) ether, trimethylolpropane tris(3-ethyl-3-oxetanylmethyl) ether, 1,4-bis(3-ethyl-3-oxetanylmethoxy)butane, 1,6-bis(3-ethyl-3-oxetanylmethoxy)hexane, pentaerythritoltris(3-ethyl-3-oxetanylmethyl) ether, pentaerythritol tetrakis(3-ethyl-3-oxetanylmethyl) ether, polyethylene glycol bis(3-ethyl-3-oxetanylmethyl) ether, dipentaerythritol hexakis(3-ethyl-3-oxetanylmethyl) ether, dipentaerythritol pentakis(3-ethyl-3-oxetanylmethyl) ether, dipentaerythritol tetrakis(3-ethyl-3-oxetanylmethyl) ether, caprolactone-modified dipentaerythritol hexakis(3-ethyl-3-oxetanylmethyl) ether, caprolactone-modified dipentaerythritol pentakis(3-ethyl-3-oxetanylmethyl) ether, ditrimethylolpropane tetrakis(3-ethyl-3-oxetanylmethyl) ether, EO-modified bisphenol A bis(3-ethyl-3-oxetanylmethyl) ether, PO-modified bisphenol A bis(3-ethyl-3-oxetanylmethyl) ether, EO-modified hydrogenated bisphenol A bis(3-ethyl-3-oxetanylmethyl) ether, PO-modified hydrogenated bisphenol A bis(3-ethyl-3-oxetanylmethyl) ether, EO-modified bisphenol F(3-ethyl-3-oxetanylmethyl) ether, and other such polyfunctional oxetanes.

These cationically polymerizable compounds may be employed singly, or two or more may be used concomitantly.

The total mass of the polymerizable compound in the ink is preferably 55 to 95 mass %, more preferably 60 to 90 mass %, with respect to the total mass of the ink. Within the afore-described ranges, curability is excellent, and viscosity is appropriate.

The method of manufacturing the polymerizable compound is not particularly limited, and a known method may be employed for synthesis. A commercial product may be used, in cases where procurable.

(c) Colorants

The ink can contain a colorant in order to improve the visibility of formed image portions.

While the coloring agent is not particularly limited, pigments and oil-soluble dyes, which have excellent weather resistance and rich color reproduction, are preferred, and these may be selected from any of the known coloring agents, such as the soluble dyes. From the standpoint of avoiding depression of the sensitivity of the curing reaction induced by activating radiation, the coloring agents that are suitable for use in the ink are preferably selected from among compounds that do not function as a polymerization inhibitor in polymerization reactions, of which the curing reaction is one.

The pigment is not particularly limited, and organic and inorganic pigments disclosed in the Color Index and having the numbers indicated below may be used, for example.

According to the intended application, there may be used:

Red or magenta pigments: Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257; Pigment Violet 3, 19, 23, 29, 30, 37, 50, 88; Pigment Orange 13, 16, 20, or 36

Blue or cyan pigments: Pigment Blue 1, 15, 15:1, 15:2, 15:3, 15:4, 15:6, 16, 17-1, 22, 27, 28, 29, 36, 60

Green pigments: Pigment Green 7, 26, 36, 50

Yellow pigments: Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, 193

Black pigments: Pigment Black 7, 28, 26

White pigments: Pigment White 6, 18, or 21

In preferred practice, the colorant is added to the ink or the inkjet recording ink, and thereafter dispersed to an appropriate degree within the ink. For dispersion of the colorant, for example, any of various dispersion machines such as a ball mill, a sand mill, an attritor, a roll mill, an agitator, a Henschel mixer, a colloidal mill, an ultrasonic homogenizer, a pearl mill, a wet jet mill, a paint shaker, or the like may be used.

During preparation of the ink, the colorant may be incorporated through direct addition together with the other components; however, in order to improve dispersibility, the colorant may be added beforehand to a solvent or a dispersing medium such as a radically polymerizable compound; uniformly dispersed or dissolved therein; and then incorporated.

(d) Dispersants

In preferred practice, the ink will contain a dispersant in order to stably disperse the pigment within the ink.

A polymeric dispersant is preferable as the dispersant. "Polymeric dispersant" refers to a dispersant having a mass-average molecular weight of 1,000 or above.

As polymeric dispersants, there may be cited polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives); Disperse Aid 6, Disperse Aid 8, Disperse Aid 15, and Disperse Aid 9100 (manufactured by San Nopco Limited); as well as various types of Solsperse dispersants such as Solsperse 3000, 5000, 9000, 12000, 13240, 13940, 17000, 22000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation; Isonet S-20 (manufactured by Sanyo Chemical Industries, Ltd.), and Disparlon KS-860, 873SN, and 874 (polymeric dispersants), #2150 (aliphatic poly carboxylic acid), and #7004 (polyether ester type), manufactured by Kusumoto Chemicals, Ltd.

The content of the respective dispersant in the ink composition is appropriately selected according to the intended purpose, but is preferably 0.05 to 15 mass %, with respect to the mass of the entire ink.

(e) Other Components

Optionally, other components besides the aforedescribed components can be added to the ink.

Examples of these other components include sensitizers, co-sensitizers, surfactants, ultraviolet absorbers, antioxidants, anti-fading agents, conductive salts, solvents, polymer compounds, and basic compounds.

Optionally, besides these, leveling additives, matting agents, waxes for adjusting film physical properties, and tackifiers that do not inhibit polymerization, employed in order to improve adhesion to a support of polyolefin, PET, or the like, can be contained.

A specific examples of tackifiers, there can be given the high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), or low molecular weight tackifying resins having a polymerizable unsaturated bond.

Next, the printing device employed to manufacture the printed article 1 is described.

Printing Device

As shown in FIG. 2, a printing device (printed article manufacturing device) 1 is adapted to eject a radiation curing ink onto a base material 30, and to then irradiate the ejected radiation curing ink with radiation to bring about curing of the radiation curing ink, and draw alphanumeric characters, pictures, or the like on the base material 30.

The printing device 1*a* is constituted by being equipped with a base 2 on which the base material 30 rests; a conveying device 3 for conveying the base material 30 in the X direction in FIG. 2 over the base 2; liquid droplet ejection heads (not shown) for ejecting the radiation curing ink; a carriage 4 provided with the plurality of liquid droplet ejection heads; and a feed device 5 for transporting the carriage in a Y direction orthogonal to the X direction. In the present embodiment, the conveying device 3 and the feed device 5 constitute a transport device for transporting the base material 30 and carriage 4 in a relative manner in the X direction and Y direction, respectively.

The conveying device 3 is constituted by being provided with a work stage 6 and a stage transport device 7 furnished on the base 2. The work stage 6 is furnished in transportable fashion in the X direction over the base 2 by the stage transport device 7; and utilizing, for example, a vacuum suction device, is adapted to retain on an XY plane the base material 30 which is conveyed from a conveying device (not shown) disposed to the upstream side from the printing device 1*a* during the printing process. The stage transport device 7 is provided with a ball and screw, linear guide, or other bearing mechanism; and is constituted such that the work stage 6 is transported in the X direction based on a stage position control signal input from a control device 8 and showing X coordinates of the work stage 6.

As shown in FIGS. 3 and 4, the carriage 4 is shaped like a rectangular plate which is transportably mounted on the feed device 5, and adapted to retain a plurality (ten in the present embodiment) of droplet ejection heads (film forming devices) 9 arrayed along the Y direction to the bottom face 4*a* side thereof.

The plurality of droplet ejection heads 9 (9Y, 9C, 9M, 9K, 9W) are provided with a multitude (plurality) of nozzles, to be discussed later, and are adapted to eject droplets of radiation curing ink based on drawing data and a drive control signal input from the control device 8. These droplet ejection heads 9 (9Y, 9C, 9M, 9K, 9W) respectively eject radiation curing inks corresponding to Y (yellow), C (cyan), M (magenta), and K (black), as well as a radiation curing ink corresponding to a transparent color or white (W). As shown in FIG. 2, tubes (conduits) 10 are linked to the respective droplet ejection heads 9 via the carriage 4. Of these ten droplet ejection heads 9, the five droplet ejection heads 9 to the left side from the middle in FIG. 3 are for ejecting droplets of the first ink, and the five droplet ejection heads 9 to the right side from the middle in FIG. 3 are for ejecting droplets of the second ink. In the present embodiment, of the ten droplet ejection heads 9, droplet ejection heads 9 that eject ink of a hue different from that of the first ink and the second ink are employed for ejection of the third ink. Of course, an additional five droplet ejection heads 9 could be furnished for ejecting droplets of the third ink.

The liquid droplet ejection head 9Y corresponding to Y (yellow) is connected via a tube 10 to a first tank 11Y filled with or storing Y (yellow) radiation curing ink, whereby Y (yellow) radiation curing ink may be supplied to the liquid droplet ejection head 9Y from this first tank 11Y.

Likewise, a second tank 11C filled with C (cyan) radiation curing ink is connected to the liquid droplet ejection head 9C corresponding to C (cyan); a third tank 11M filled with M (magenta) radiation curing ink to the liquid droplet ejection head 9M corresponding to M (magenta); a fourth tank 11K filled with K (black) radiation curing ink to the liquid droplet ejection head 9K corresponding to K (black); and a fifth tank 11W filled with W (transparent) radiation curing ink to the liquid droplet ejection head 9W corresponding to W (transparent or white, in this case, transparent), respectively.

Through this configuration, the liquid droplet ejection heads are supplied with the corresponding radiation curing inks.

These liquid droplet ejection heads 9Y, 9C, 9M, 9K, 9W, the tubes (conduits) 10, and the tanks 11Y, 11C, 11M, 11K, 11W are furnished with heating means such as heaters (not shown) for the respective systems of each color (Y, C, M, K, W). Specifically, in each of the respective color systems, at least one of the liquid droplet ejection head 9, the tube 10, and the tank 11 is furnished with heating means for depressing the viscosity of the radiation curing ink and increasing the flowability thereof, whereby the radiation curing ink is adjusted to give good ejectability from the liquid droplet ejection head 9.

Here, as mentioned previously, the radiation curing ink is of a type that cures upon receiving radiation of a predetermined wavelength, such as an ultraviolet curing ink, for example. Normally, the wavelength bands of radiation (ultraviolet) absorbed by radiation curing inks differ according to the components (formulation) thereof, and therefore the optimal wavelength value for curing, specifically, the optimal curing wavelength, will differ for each ink.

FIGS. 5A to 5C are schematic configuration views of a liquid droplet ejection head 9. FIG. 5A is a plan view of the liquid droplet ejection head 9 viewed from the work stage 6 side; FIG. 5B is a fragmentary perspective view of the liquid droplet ejection head; and FIG. 5C is a fragmentary sectional view of one nozzle of the liquid droplet ejection head 9.

As shown in FIG. 5A, the liquid droplet ejection head 9 has a plurality (for example, 180) nozzles N which are arrayed in a direction intersecting the Y direction; in the present embodiment, this is the X direction. The plurality of nozzles N form a nozzle array NA. While only the nozzles of a single array are shown in the drawing, the number of nozzles and the number of nozzle arrays furnished to the liquid droplet ejection head 9 may be freely modified, and a plurality of nozzle arrays NA arrayed in the X direction could be furnished in the Y direction, for example.

As shown in FIG. 5B, the configuration is provided with an oscillator plate 20 furnished with a material supply port 20*a* that is linked to a tube 10; a nozzle plate 21 furnished with nozzles N; a reservoir (liquid reserve) 22 furnished between the oscillator plate 20 and the nozzle plate 21; a plurality of partition walls 23; and a plurality of cavities (liquid chambers) 24. The front face (bottom face) of the nozzle plate 21 serves as a nozzle surface 21*a* in which the plurality of nozzles N are formed. Piezoelectric elements (driving elements) PZ are disposed, in corresponding fashion with the nozzles N, on the oscillator plate 20. The piezoelectric elements PZ are composed of piezo elements, for example.

The reservoir 22 is filled with radiation curing ink which is supplied via the material supply port 20*a*. The cavities 24 are formed in such a way as to be bounded by the oscillator plate 20, the nozzle plate 21, and pairs of partition walls 23, and are furnished on a one-to-one basis in corresponding fashion with the nozzles N. Radiation curing ink from the reservoir 22 is introduced into the cavities 24 via a supply opening 24*a* furnished between the pair of partition walls 23.

As shown in FIG. 5C, the piezoelectric element PZ has a piezoelectric material 25 sandwiched by a pair of electrodes 26, and is configured such that the piezoelectric material 25 constricts upon application of a drive signal to the pair of electrodes 26. Consequently, the oscillator plate 20 on which the piezoelectric element PZ is disposed simultaneously flexes towards the outside (towards the opposite side from the cavity 24) in unison with the piezoelectric element PZ, thereby increasing the volume of the cavity 24.

The radiation curing ink, in an amount commensurate with the increased volume of the cavity 24, thereby flows in from the liquid reserve 22 via the supply opening 24*a*. From this state, once the drive signal ceases to be applied to the piezoelectric element PZ, the piezoelectric element PZ and the oscillator plate 20 both recover to their original shapes, and the cavity 24 recovers to its original volume. Therefore, the pressure of the radiation curing ink inside the cavity 24 rises, and a droplet L of radiation curing ink is ejected towards the base material 30 from the nozzle N.

Liquid droplet ejection heads 9 constituted in this manner are disposed with the bottom face of the nozzle plate 21 thereof, specifically, the nozzle N formation surface (nozzle surface) NS, protruding from the bottom face 4*a* of the carriage 4, further towards the bottom from the bottom face of the carriage 4 as shown in FIG. 3.

Additionally, as shown in FIGS. 3 and 4, radiation irradiating means 12 are disposed adjacently to either side of the plurality of arrayed liquid droplet ejection heads 9 (there are ten in the drawing) on the carriage 4. Specifically, the radiation irradiating means 12 are respectively disposed to either side of the liquid droplet ejection heads 9 which are arrayed in the Y direction, along the direction of array.

These radiation irradiating means 12 are adapted to bring about curing of the radiation curing ink, and in the present embodiment are composed of a multitude of light-emitting diodes (LEDs). However, the radiation irradiating means 12 in the present invention are not limited to LEDs, provided that they are capable of shooting out radiation of a wavelength that precipitates polymerization of the radiation curing ink; besides LEDs, for example, laser diodes (LD), mercury lamps, metal halide lamps, xenon lamps, excimer lamps, and the like may be employed as the radiation irradiating means 12. For example, in a case in which an ultraviolet curing ink is employed as the radiation curing ink, various light sources that shoot out ultraviolet could be used.

The radiation irradiated by the LED radiation irradiating means 12 of the present embodiment has a wavelength band that includes the optimal curing wavelength of the radiation curing ink ejected by the liquid droplet ejection heads 9. That is, as mentioned previously, whereas the optimal curing wavelengths of radiation curing inks are assumed to differ according to the components (formulation) thereof, radiation having the optimal curing wavelength of a radiation curing ink may be irradiated through irradiation of radiation in the manner discussed above.

As shown in FIG. 2, the feed device 5 that transports the carriage 4 has, for example, a bridge structure that spans the base 2, and is provided with a with a ball and screw, linear guide, or other bearing mechanism with respect to the Y direction and a Z direction orthogonal to the XY plane. The feed device 5 constituted in this manner is adapted to transport the carriage 4 in the Y direction, as well as transport it in the Z direction, on the basis of a carriage positioning signal input from the control device 8, and showing Y coordinates and Z coordinates for the carriage 4.

The control device 8 is adapted to output a stage positioning signal to the stage transport device 7, and to output the carriage positioning signal to the feed device 5, as well as to output drawing data and drive control signals to the drive circuit boards (not shown) of the liquid droplet ejection heads 9. The control device 8 thereby performs synchronous control of an operation to position the base material 30 through transport thereof by the work stage 6, and an operation to position the liquid droplet ejection heads 9 through transport thereof by the carriage 4, whereby the base material 30 and the carriage 4 are transported in a relative manner; and to then perform an operation to eject liquid droplets from the liquid droplet ejection heads 9, whereby droplets of the radiation curing ink are distributed at predetermined positions on the base material 30. Additionally, separately from the operation to eject liquid droplets from the liquid droplet ejection heads 9, the control device 8 also performs an operation to irradiate radiation from the radiation irradiating means 12.

The configuration of the printing device 1*a* is as described above.

Next, the printed article 1 is described.

As shown in FIGS. 1A and 1B, the printed article 1 has, furnished either directly or indirectly on a base material 2, a first printed layer 31, a second printed layer 32, and a third printed layer 33. Specifically, the printed article 1 has a base material 30; the first printed layer 31 which is printed employing the first ink, and the second printed layer 32 which is printed employing the second ink, the layers being furnished in mutually different areas on the base material 30 and mutually differing in terms of a physical property or a chemical property, as well as having a color difference; and the third printed layer 33 which is printed employing the third ink, the layer being furnished so as to cover or fill the boundary between the first printed layer 31 and the second printed layer 32, and having a color difference with respect to the first printed layer 31 and the second printed layer 32. By furnishing the third printed layer 33, the first printed layer 31 and the second printed layer 32 can be separated, whereby in cases of a small color difference between the first printed layer 31 and the second printed layer 32, the first printed layer 31 and the second printed layer 32 can be made to appear the same color, as will be discussed later.

The constituent material of the base material 30 is not particularly limited, and, for example, various types of resin, various types of glass, various types of metal, and the like can be used. However, resin materials are preferred from the standpoint of being amenable to being deformed.

The resin materials are not particularly limited, and, for example, polyethylene, polypropylene, ethylene-propylene copolymers, ethylene-vinyl acetate copolymers (EVA), and other polyolefins; cyclic polyolefins, modified polyolefins, polyvinyl chloride, polyvinylidene chloride, polystyrene, polyamide, polyimide, polyamide-imide, polycarbonate, poly-(4-methylpentene-1), ionomers, acrylic resins, polymethyl methacrylate, acrylonitrile-butadiene-styrene copolymers (ABS resins), acrylonitrile-styrene copolymers (AS resins), butadiene-styrene copolymers, polyoxymethylene, polyvinyl alcohol (PVA), ethylene-vinyl alcohol copolymers (EVOH); polyethylene terephthalate (PET), polybutylene terephthate (PBT), polycyclohexane terephthate (PCT) and other polyesters; polyether, polyether ketone (PEK), polyether ether ketone (PEEK), polyether imide, polyacetal (POM), polyphenylene oxide, modified polyphenylene oxide, polysulfone, polyether sulfone, polyphenylene sulfide, polyarylate, aromatic polyesters (liquid crystal polymers), and the like, or copolymers, blends, or polymer alloys composed predominantly thereof, may be cited. These may be employed singly, or in combinations of two or more (for example, in a laminate of two or more layers).

In a case in which the printed article 1 is configured to be viewed from the base material 30 side, the base material 30 is made transparent. In a case in which the printed article 1 is configured to be viewed from opposite side from the base material 30, i.e., from the side where the first printed layer 31, the second printed layer 32, and the third printed layer 33 are situated, the base material 30 may be either opaque or transparent.

The printed article 1 prior to processing as shown in FIG. 1A has a first processing area 41 which is a region subjected to processing to bring about deformation, i.e., a region subjected to a deforming process; and a second processing area 42 which is a region subjected to a shearing process, or to pressure in association with mounting, or the like. Specifically, the printed article 1 subsequent to processing as shown in FIG. 1B has a first processing area 41 which is a region having been subjected to a deforming process; and a second processing area 42 which is a region having been subjected to a shearing process, or to pressure in association with mounting, or the like. The first ink layer 31 is furnished in the first processing area 41. The second ink layer 32 furnished in the second processing area 42. Both the printed article 1 prior to processing as shown in FIG. 1A and the printed article 1 subsequent to processing as shown in FIG. 1B are included in the present invention.

As deforming processes, there may be cited, for example, processes involving localized stretching, such as a drawing process, a bending process, or the like. In the illustrated configuration, a region of bottomed cylindrical shape has been formed by a drawing process in the first processing area 41 of the printed article 1.

As shearing processes, there may be cited, for example, punching, cutting, or the like. In the illustrated configuration, an opening has been formed by a punching process in the second processing area 42 of the printed article 1.

The color difference between the first printed layer 31 and the second printed layer 32, when measured by a colorimeter (color difference meter), is preferably 2 or less, more preferably 1 or less, and still more preferably from 0.1 to 1. In so doing, the first printed layer 31 and the second printed layer 32 will be perceived as having the same color when the first printed layer 31 and the second printed layer 32 are slightly separated.

In preferred practice, the first printed layer 31 and the second printed layer 32 include coloring matter of the same hue; and preferably include the same coloring matter in common. In so doing, the aforedescribed color difference when measured by a colorimeter can be created between the first printed layer 31 and the second printed layer 32.

Because the first printed layer 31 and the second printed layer 32 differ in terms of a property thereof, the compositions of the polymerizable compounds will differ, and therefore even if coloring matter of the same hue or same coloring matter in common is employed, the color difference between the first printed layer 31 and the second printed layer 32 will differ.

The first printed layer 31 and the second printed layer 32 may be in contact, or may be disposed apart. In the present embodiment, first printed layer 31 and the second printed layer 32 are in contact. The third printed layer 33 is furnished covering the boundary between the first printed layer 31 and the second printed layer 32, as seen from the direction in which the printed article 1 is intended to be viewed. Specifically, the direction in which the printed article 1 is intended to be viewed is the opposite side from the base material 30; and the third printed layer 33 is furnished over the first printed layer 31 and the second printed layer 32 so as to cover the boundary between the first printed layer 31 and the second printed layer 32, as seen from the opposite side from the base material 30. In a case in which the first printed layer 31 and the second printed layer 32 are disposed apart, the boundary between the first printed layer 31 and the second printed layer 32 refers to the gap between the first printed layer 31 and the second printed layer 32.

For the third printed layer 33, the color difference between the third printed layer 33 and the first printed layer 31 when measured by a colorimeter is 3 or greater, and the color difference between the third printed layer 33 and the second printed layer 32 when measured by a colorimeter is 3 or greater. In so doing, the third printed layer 33 can be perceived as separate from the first printed layer 31 and the second printed layer 32, whereby the first printed layer 31 and the second printed layer 32 can be separated, and the first printed layer 31 and the second printed layer 32 can be made to appear the same color.

The third printed layer 33 may be the same or different in hue from the first printed layer 31 and the second printed layer 32, but is preferably different in hue from the first printed layer 31 and the second printed layer 32. In so doing, the third printed layer 33 can more reliably be perceived as separate from the first printed layer 31 and the second printed layer 32, whereby the first printed layer 31 and the second printed layer 32 can be separated, and the first printed layer 31 and the second printed layer 32 can be made to appear the same color.

The third printed layer 33 may be the same or different in brightness from the first printed layer 31 and the second printed layer 32, but preferably has higher brightness than the first printed layer 31 and the second printed layer 32. In so doing, the third printed layer 33 can be made conspicuous, and more reliably be perceived as separate from the first printed layer 31 and the second printed layer 32, whereby the first printed layer 31 and the second printed layer 32 can be separated, and the first printed layer 31 and the second printed layer 32 can be made to appear the same color.

The width w of the third printed layer 33 is preferably 0.35 mm or more, and it is more preferable if 10 mm or more can be ensured. In so doing, the first printed layer 31 and the second printed layer 32 can be separated to an extent such that the first printed layer 31 and the second printed layer 32 are perceived as having the same color.

The first printed layer 31, the second printed layer 32, and the third printed layer 33 are respectively formed through printing. In the present embodiment, the first printed layer 31, the second printed layer 32, and the third printed layer 33 are respectively formed by application (coating) of ink by an inkjet method employing the printing device 1*a*. Specifically, the first printed layer 31 is applied as droplets of the first ink ejected from nozzles N in an inkjet method, and cured by irradiation with radiation. The second printed layer 32 is applied as droplets of the second ink ejected from nozzles N in an inkjet method, and cured by irradiation with radiation. The third printed layer 33 is applied as droplets of the first ink and the second ink respectively ejected from nozzles N in an inkjet method, and cured by irradiation with radiation.

In preferred practice, the pigment concentration (coloring matter concentration) of the first ink, the second ink, and the third ink will be the same. Also, in preferred practice, the viscosity of the first ink, the second ink, and the third ink will be about the same. Additionally, preferred practice, the surface tension of the first ink, the second ink, and the third ink will be about the same.

The printed article 1 is not particularly limited, and as examples thereof, there may be cited interior components for cars, such as a speedometer or the like; exterior components for electronic devices; masks; signage; and the like.

Next, the method of manufacturing the printed article 1 is described.

The printing device 1*a* is employed for manufacturing the printed article 1.

Firstly, the base material 30 is rested on the work stage 6 as shown in FIG. 2.

Next, the printing device 1*a* is operated to eject and apply the first ink onto the region in which the first printed layer 31 is to be formed on the base material 30, and to eject and apply the second ink onto the region in which the second printed layer 32 is to be formed. The applied first ink and second ink are then irradiated with radiation by the radiation irradiating means 12 to bring about curing and form the first printed layer 31 and the second printed layer 32.

Next, the third ink is ejected and applied onto a region in which the third printed layer 33 is to be formed over the first printed layer 31 and the second printed layer 32. The applied third ink is then irradiated with radiation by the radiation irradiating means 12 to bring about curing and form the third printed layer 33.

Next, a drawing process is performed on the first processing area 41 which has been furnished with the first printed layer 31, and a region of bottomed cylindrical shape is formed. The drawing process is performed while heating the first processing area 41.

Additionally, an opening is formed by a punching process in the second processing area 42 which has been furnished with the second printed layer 32.

Either the drawing process of the first processing area 41 or the punching process of the second processing area 42 may be performed first.

As described previously, according to this printed article 1, by furnishing the third printed layer 33, the first printed layer 31 and the second printed layer 32 can be separated, whereby the first printed layer 31 and the second printed layer 32 can be made to appear the same color.

Second Embodiment

Figure 6:
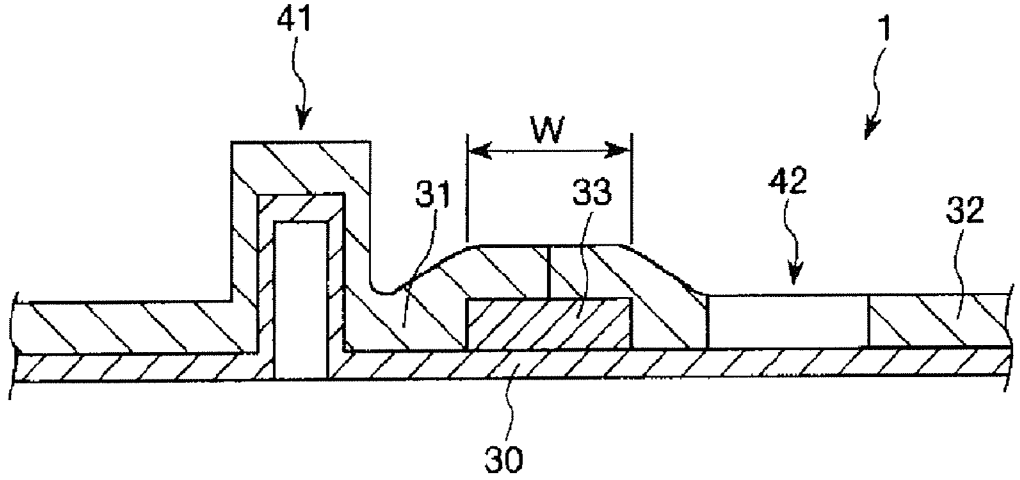
FIG. 6 is a cross sectional view showing a second embodiment of the printed article of the present invention.

FIG. 6 is a cross sectional view showing a second embodiment of the printed article of the present invention. In the following description, the left side in FIG. 6 shall be designated as "left," the right side as "right," the top side as "top," and the bottom side as "bottom."

The following description of the second embodiment shall focus on points of difference from the first embodiment discussed previously, omitting description of comparable arrangements.

As shown in FIG. 6, in the printed article 1 of the second embodiment, the direction in which the printed article 1 is intended to be viewed is from the base material 30 side; and the third printed layer 33 is furnished over the base material 30 so as to cover the boundary between the first printed layer 31 and the second printed layer 32, as seen from the base material 30 side.

During manufacture of this printed article 1, firstly, the third printed layer 33 is printed onto the base material 30. At this time, the third ink is ejected and applied onto the region in which the third printed layer 33 is to be formed on the base material 30, and the applied third ink is irradiated with radiation by the radiation irradiating means 12 to bring about curing, forming the third printed layer 33.

Next, in mutually different areas on the base material 30 and on the third printed layer 33, the first printed layer 31 and the second printed layer 32 are printed in such a fashion that the boundary between the first printed layer 31 and the second printed layer 32 is covered or filled by the third printed layer 33. At this time, the first ink is ejected and applied onto the region in which the first printed layer 31 is to be formed on the base material 30 and on the third printed layer 33, the second ink is ink is ejected and applied onto the region in which the second printed layer 32 is to be formed, and the applied first ink and second ink are irradiated with radiation by the radiation irradiating means 12 to bring about curing, forming the first printed layer 31 and the second printed layer 32.

Third Embodiment

Figure 7:
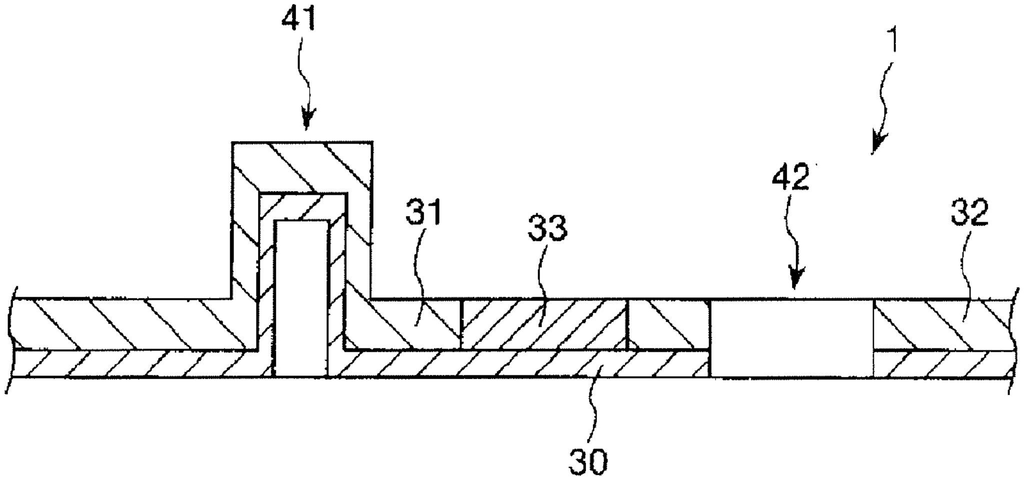
FIG. 7 is a cross sectional view showing a third embodiment of the printed article of the present invention.

FIG. 7 is a cross sectional view showing a third embodiment of the printed article of the present invention. In the following description, the left side in FIG. 7 shall be designated as "left," the right side as "right," the top side as "top," and the bottom side as "bottom."

The description of the third embodiment shall focus on points of difference from the first embodiment discussed previously, omitting description of comparable arrangements.

As shown in FIG. 7, in the printed article 1 of the third embodiment, the first printed layer 31 and the second printed layer 32 are disposed apart. The third printed layer 33 is then furnished onto the base material 30 so as to fill the gap between the first printed layer 31 and the second printed layer 32. In cases in which the first printed layer 31 and the second printed layer 32 are disposed apart, the boundary between the first printed layer 31 and the second printed layer 32 refers to the gap between the first printed layer 31 and the second printed layer 32.

In this printed article 1, the printed article 1 can be viewed from either the base material 30 side, or from the opposite side from the base material 30, i.e., the side where the first printed layer 31, the second printed layer 32, and the third printed layer 33 are situated.

During manufacture of this printed article 1, the first ink is ejected and applied onto the region in which the first printed layer 31 is to be formed on the base material 30, the second ink is ink is ejected and applied onto the region in which the second printed layer 32 is to be formed, and the first ink and the second ink are ejected and applied onto the region in which the third printed layer 33 is to be formed. The applied first ink and second ink are irradiated with radiation by the radiation irradiating means 12 to bring about curing, and form the first printed layer 31, the second printed layer 32, and the third printed layer 33.

Fourth Embodiment

Figure 8A:
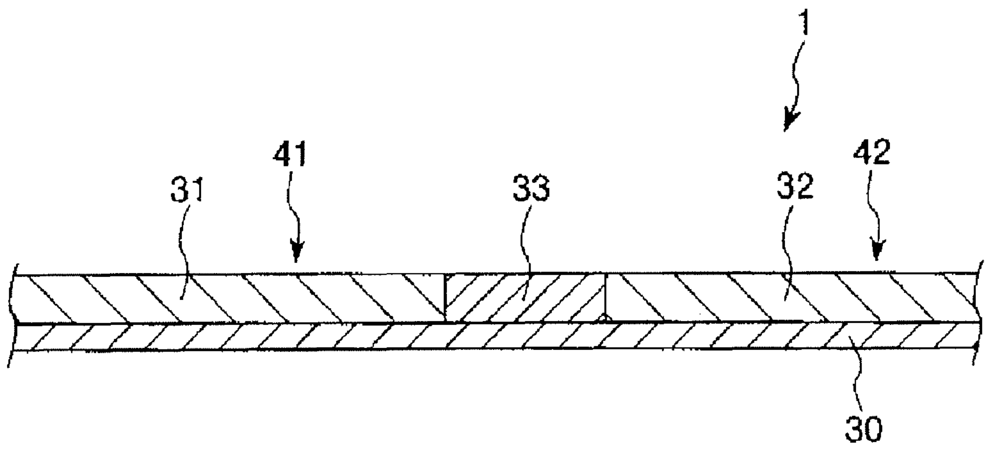
FIGS. 8A and 8B are cross sectional views showing a fourth embodiment of the printed article of the present invention.
Figure 8B:
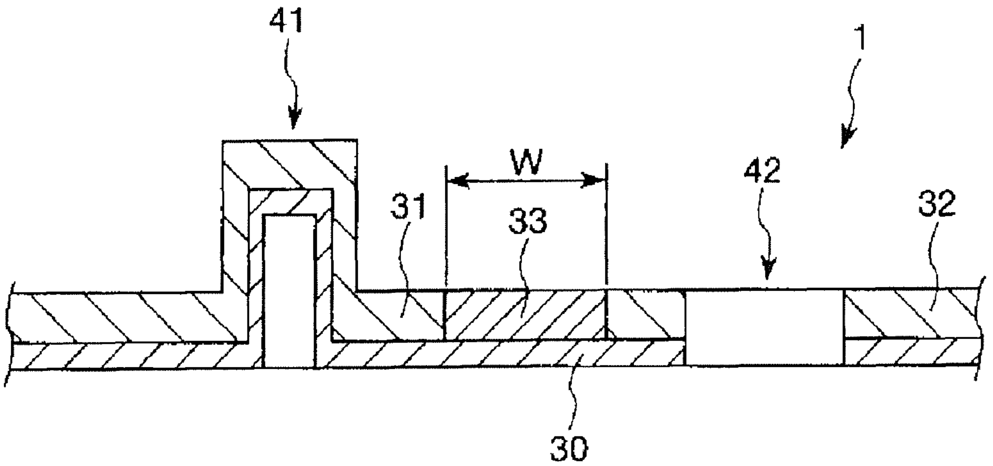
Figure 9:
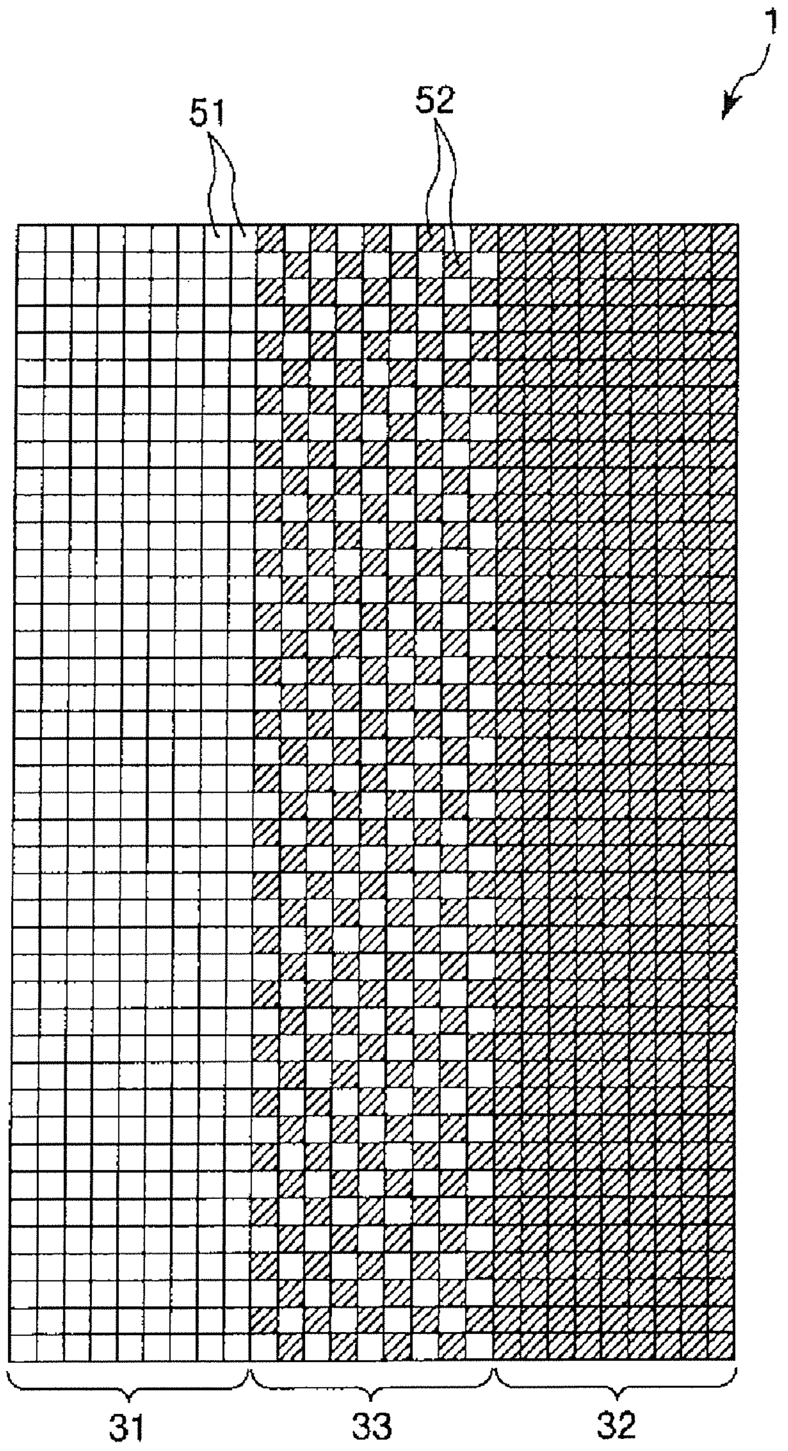
FIG. 9 is a plan view showing a first printed layer, a second printed layer, and a third printed layer of the printed article shown in FIGS. 8A and 8B.

FIGS. 8A and 8B are cross sectional views showing a fourth embodiment of the printed article of the present invention, wherein FIG. 8A shows the article prior to performing a deforming process and a shearing process, and FIG. 8B shows the article subsequent to performing a deforming process and a shearing process. FIG. 9 is a plan view showing a first printed layer, a second printed layer, and a third printed layer of the printed article shown in FIGS. 8A and 8B.

In the following description, the left side in FIGS. 8A and 8B shall be designated as "left," the right side as "right," the top side as "top," and the bottom side as "bottom"; while the left side in FIG. 9 shall be designated as "left," and the right side as "right." In FIG. 9, the pixels are depicted in enlarged form to aid understanding.

The following description of the fourth embodiment shall focus on points of difference from the first embodiment discussed previously, omitting description of comparable arrangements.

As shown in FIGS. 8A, 8B and 9, the printed article 1 has a base material (substrate) 30; a first printed layer 31 printed (formed) employing a first ink, and a second printed layer 32 printed employing a second ink, the layers being furnished in mutually different areas on the base material 30, and mutually differing in terms of a property or function, as well as having a color difference; and a third printed layer 33 furnished so as to cover or fill the boundary between the first printed layer 31 and the second printed layer 32, and forming a mixed area that includes the first ink and the second ink.

The first ink and the second ink are comparable to those employed in the first embodiment.

Next, the printed article 1 is described.

As compared with the printed article 1 of the first embodiment, in the printed article 1 of the fourth embodiment, the third printed layer 33 is furnished so as to cover or fill the boundary between the first printed layer 31 and the second printed layer 32, and forms a mixed area that includes the first ink and the second ink.

By furnishing the third printed layer 33, the first printed layer 31 and the second printed layer 32 can be separated, whereby in cases of a small color difference between the first printed layer 31 and the second printed layer 32, the first printed layer 31 and the second printed layer 32 can be made to appear the same color, as will be discussed later. Additionally, because the third printed layer 33 includes the first ink and the second ink, the boundary between the first printed layer 31 and the second printed layer 32 is unlikely to be conspicuous.

The first printed layer 31 and the second printed layer 32 may be in contact, or may be disposed apart. In the present embodiment, first printed layer 31 and the second printed layer 32 are disposed apart. The third printed layer 33 is furnished on the base material 30 so as to fill the gap between the first printed layer 31 and the second printed layer 32. In a case in which the first printed layer 31 and the second printed layer 32 are disposed apart, the boundary between the first printed layer 31 and the second printed layer 32 refers to the gap between the first printed layer 31 and the second printed layer 32.

The third printed layer 33 has a plurality of first pixels 51 which are printed employing the first ink, and a plurality of second pixels 52 which are printed employing the second ink 32. Therefore, a tone gradation between the first printed layer 31 and the second printed layer 32 is formed between the first printed layer 31 and the second printed layer 32, and the boundary between the first printed layer 31 and the second printed layer 32 can be made inconspicuous. In a case where the third printed layer 33 is formed employing the printing device 1, single pixels of the first pixels 51 and the second pixels 52 may be formed by single dots (droplets, single droplets), or formed by a plurality of dots.

In this third printed layer 33, the first pixels 51 and the second pixels 52 are disposed in a regular, i.e., cyclical pattern. Moreover, the proportion of the first pixels 51 and the second pixels 52 in the third printed layer 33 is set to a constant one. In so doing, the third printed layer 33 can be readily designed.

The proportion of the first pixels 51 in the third printed layer 33 and the proportion of the second pixels 52 in the third printed layer 33 are not particularly limited; however, the proportion of the first pixels 51 in the third printed layer 33 is preferably from 5% to 95%, and more preferably from 30% to 70%. Likewise, the proportion of the second pixels 52 in the third printed layer 33 is preferably from 5% to 95%, and more preferably from 30% to 70%.

As in a second embodiment to be discussed later, the proportions of the first pixels 51 and the second pixels 52 in the third printed layer 33 may vary towards the second printed layer 32 from the first printed layer 31. In so doing, the boundary between the first printed layer 31 and the second printed layer 32 can be made inconspicuous.

The width w of the third printed layer 33 is preferably 0.35 or more, and it is more preferable if 10 or more can be ensured. In so doing, the first printed layer 31 and the second printed layer 32 can be separated to an extent such that the first printed layer 31 and the second printed layer 32 are perceived as having the same color.

Next, the method of manufacturing the printed article 1 is described.

The printing device 1*a* is employed for manufacturing the printed article 1.

Firstly, the base material 30 is rested on the work stage 6 as shown in FIG. 2.

Next, the printing device 1*a* is operated to eject and apply the first ink onto the region in which the first printed layer 31 is to be formed on the base material 30, to eject and apply the second ink onto the region in which the second printed layer 32 is to be formed, and to eject and apply the first ink and the second ink onto the region in which the third printed layer 33 is to be formed.

The applied first ink and second ink are then irradiated with radiation by the radiation irradiating means 12 to bring about curing, and form the first printed layer 31, the second printed layer 32, and the third printed layer 33.

Next, a drawing process is performed on the first processing area 41 which has been furnished with the first printed layer 31, and a region of bottomed cylindrical shape is formed. The drawing process is performed while heating the first processing area 41.

Additionally, an opening is formed by a punching process in the second processing area 42 which has been furnished with the second printed layer 32.

Either the drawing process of the first processing area 41 or the punching process of the second processing area 42 may be performed first.

As described previously, according to this printed article 1, by furnishing the third printed layer 33, the first printed layer 31 and the second printed layer 32 can be separated, whereby the first printed layer 31 and the second printed layer 32 can be made to appear the same color. Additionally, because the third printed layer 33 includes the first ink and the second ink, the boundary between the first printed layer 31 and the second printed layer 32 is unlikely to be conspicuous.

Fifth Embodiment

Figure 10:
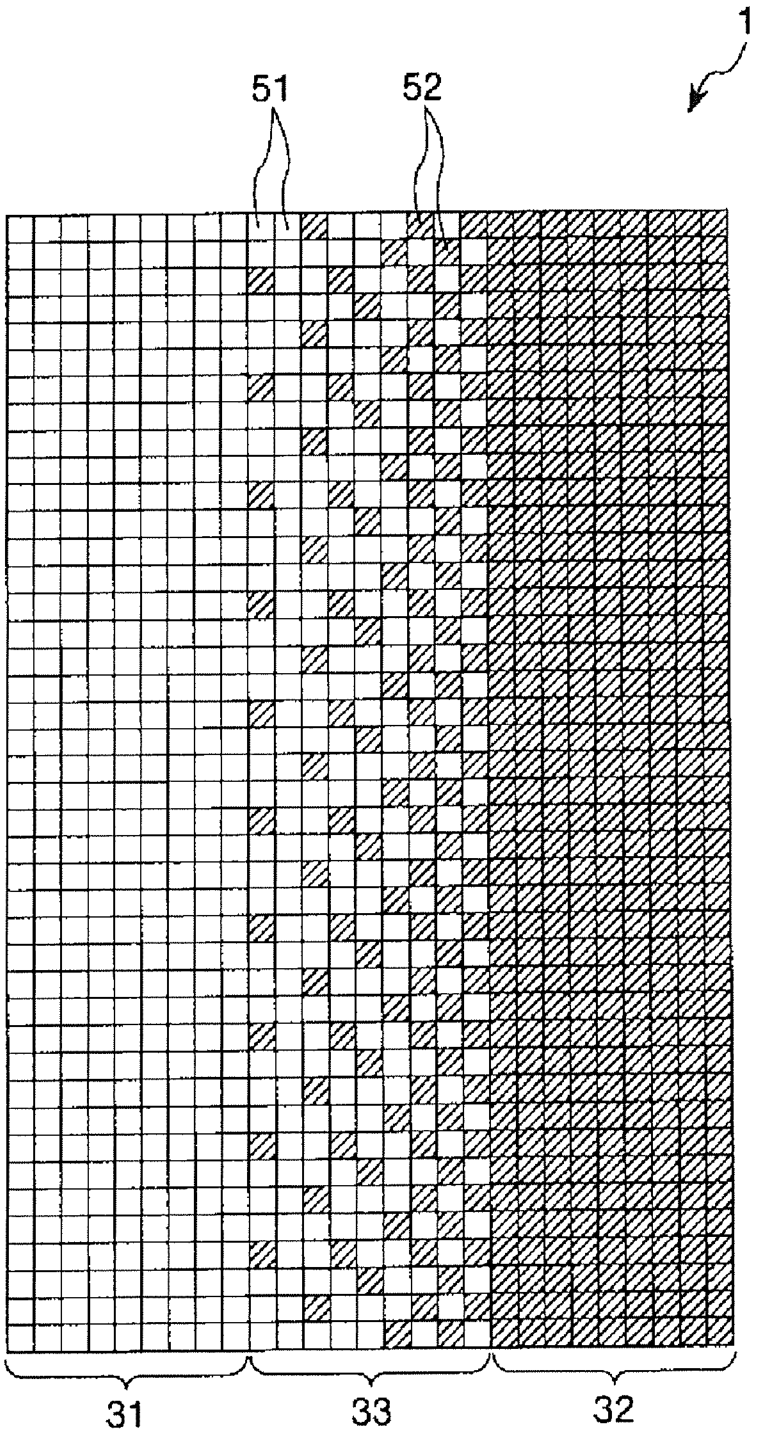
FIG. 10 is a plan view showing a first printed layer, a second printed layer, and a third printed layer in a fifth embodiment of the printed article of the present invention.

FIG. 10 is a plan view showing a first printed layer, a second printed layer, and a third printed layer in a fifth embodiment of the printed article of the present invention. The left side in FIG. 10 shall be designated as "left," and the right side as "right." In FIG. 10, the pixels are depicted in enlarged form to aid understanding.

The following description of the fifth embodiment shall focus on points of difference from the fourth embodiment discussed previously, omitting description of comparable arrangements.

As shown in FIG. 10, in the printed article 1 of the fifth embodiment, the first pixels 51 and the second pixels 52 are disposed in an irregular arrangement in the third printed layer 33.

Moreover, the proportions of the first pixels 51 and the second pixels 52 in the third printed layer 33 vary towards the second printed layer 32 from the first printed layer 31. Specifically, the proportion of the first pixels 51 in the third printed layer 33 decreases towards the second printed layer 32 from the first printed layer 31. Additionally, the proportion of the second pixels 52 in the third printed layer 33 increases towards the second printed layer 32 from the first printed layer 31.

In so doing, a plurality of tone gradations between the first printed layer 31 and the second printed layer 32 are formed between the first printed layer 31 and the second printed layer 32, and the boundary between the first printed layer 31 and the second printed layer 32 can be made inconspicuous.

The irregularly disposed first pixels 51 and second pixels 52 can be formed by a dither mask process.

The proportions of the first pixels 51 and second pixels 52 in the third printed layer 33 may be a constant one, as in the fourth embodiment discussed previously.

In the preceding embodiments, the first printed layer, the second printed layer, and the third printed layer are respectively formed on the base material, but the present invention is not limited thereto.

Specifically, the third printed layer may be furnished so as to cover the boundary between the first printed layer and the second printed layer, as seen from the direction in which the printed article is intended to be viewed. The first printed layer and the second printed layer may be in contact, or apart.

In more specific terms, in a case in which the printed article is configured to be viewed from the opposite side from the base material, i.e., for the printed article to be viewed from the printed layer side, the first printed layer and the second printed layer may be formed on the base material, and the third printed layer may then be formed over the first printed layer and the second printed layer.

In a case in which the printed article is configured to be viewed from the base material side, the third printed layer may be formed on the base material, and the first printed layer and the second printed layer may then be formed over the third printed layer and the base material.

In the preceding embodiments, the first printed layer, the second printed layer, and the third printed layer are printed simultaneously, but the invention is not limited thereto.

For example, the first printed layer and the second printed layer could be printed first, and the third printed layer printed thereafter.

Alternatively, the third printed layer could be printed first, and the first printed layer and the second printed layer printed thereafter.

In the preceding embodiments, during formation of the third printed layer, it is preferable for the size of the droplets of the first ink to be equal to the size of the droplets of the second ink. For example, it is preferable for the size of the droplets of the first ink to be within ±10% of the size of the droplets of the second ink.

In the preceding embodiments, it is preferable for the viscosity of the droplets of the first ink to be equal to the viscosity of the droplets of the second ink. For example, it is preferable for the viscosity the droplets of the first ink to be within ±10% of the viscosity of the droplets of the second ink.

Moreover, in preceding embodiments, it is preferable for the dot spacing of the first ink to be equal to the dot spacing of the second ink.

While the printed article and the method of manufacturing a printed article of the present invention have been described on the basis of the illustrated embodiments, the present invention is not limited thereto, and the configurations of various parts may be replaced by any configurations having equivalent functions. Other additional configurations and steps may be incorporated to the present invention as well.

The present invention may combine any two or more configurations (features) among those taught in the preceding embodiments.

In the preceding embodiments, the printed article has a first printed layer formed of a first ink, a second printed layer formed of a second ink, and a third printed layer formed of a third ink; however, the present invention may further have a fourth printed layer formed of a fourth ink, and so on. Specifically, the number of printed layers is not limited to three, and four or more may be furnished.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printed article comprising:

a base material;

a first printed layer printed with a first ink in a first area of the base material;

a second printed layer printed with a second ink in a second area different from the first area of the base material, the second ink being different in a property or function from the first ink and having a color difference of 2 or less with respect to the first ink when measured by a colorimeter; and a third printed layer printed with a third ink, having a color difference with respect to the first printed layer and the second printed layer which is greater than the color difference between the first printed layer and the second printed layer so as to make the first printed layer and the second printed layer appear the same color, the first printed layer and the second printed layer being in contact, and the third printed layer covering the boundary between the first printed layer and the second printed layer, as seen from a direction in which the printed article is intended to be viewed.

2. The printed article according to claim 1, wherein the color difference between the third printed layer and the first printed layer, when measured by a colorimeter, is 3 or greater, and the color difference between the third printed layer and the second printed layer, when measured by a colorimeter, is 3 or greater.

3. The printed article according to claim 1, wherein the third printed layer differs in hue from the first printed layer and the second printed layer.

4. The printed article according to claim 1, wherein the third printed layer has higher brightness than the first printed layer and the second printed layer.

5. The printed article according to claim 1, wherein a width of the third printed layer is 0.35 mm or greater.

6. The printed article according to claim 1, wherein the base material has a first processing area subjected to a deforming process, and the first printed layer is in the first processing area.

7. The printed article according to claim 6, wherein the printed article has been deformed at the first processing area.

8. The printed article according to claim 1, wherein the base material has a second processing area subjected to a shearing process, and the second printed layer is in the second processing area.

9. The printed article according to claim 8, wherein the printed article has been sheared at the second processing area.

10. The printed article according to claim 1, wherein the property is a physical property or a chemical property.

11. The printed article according to claim 1, wherein the first printed layer is formed by applying the first ink as droplets ejected from nozzles by an inkjet method, the second printed layer is formed by applying the second ink as droplets ejected from nozzles by the inkjet method, and the third printed layer is formed by applying the third ink as droplets ejected from nozzles by the inkjet method.

12. The printed article according to claim 1, wherein the first ink, the second ink, and the third ink are respectively radiation curing inks, the first printed layer is formed by application of the first ink as droplets ejected from nozzles by an inkjet method, and cured through irradiation with radiation, the second printed layer is formed by application of the second ink as droplets ejected from nozzles by the inkjet method, and cured through irradiation with radiation, and the third printed layer is formed by application of the third ink as droplets ejected from nozzles by the inkjet method, and cured through irradiation with radiation.

13. The printed article according to claim 6, wherein the base material has a second processing area subjected to a shearing process, and the second printed layer is in the second processing area.

* * * * *